US008788964B2

(12) United States Patent
Shin et al.

(10) Patent No.: US 8,788,964 B2
(45) Date of Patent: Jul. 22, 2014

(54) METHOD AND SYSTEM FOR CONFIGURING AN IDLE SCREEN IN A PORTABLE TERMINAL

(75) Inventors: Seung Woo Shin, Seoul (KR); Jung Yeob Oh, Seongnam-si (KR); Myeong Lo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 723 days.

(21) Appl. No.: 12/581,515

(22) Filed: Oct. 19, 2009

(65) Prior Publication Data

US 2010/0100841 A1 Apr. 22, 2010

(30) Foreign Application Priority Data

Oct. 20, 2008 (KR) .................. 10-2008-0102381

(51) Int. Cl.
*G06F 3/048* (2013.01)
*G06F 3/0485* (2013.01)
*G06F 3/0488* (2013.01)

(52) U.S. Cl.
CPC .......... *G06F 3/0485* (2013.01); *G06F 3/04883* (2013.01)
USPC ....................................... 715/784

(58) Field of Classification Search
CPC .. G06F 3/04883; G06F 3/0485; G06F 3/0488
USPC ....................................... 715/784
See application file for complete search history.

(56) References Cited

U.S. PATENT DOCUMENTS

| 5,196,838 A | * | 3/1993 | Meier et al. | ............. 345/684 |
| 7,600,192 B1 | * | 10/2009 | Hashimoto et al. | ............. 715/802 |
| 2004/0174398 A1 | * | 9/2004 | Luke et al. | ............. 345/856 |
| 2005/0132299 A1 | | 6/2005 | Jones et al. | |
| 2008/0165153 A1 | | 7/2008 | Platzer et al. | |

FOREIGN PATENT DOCUMENTS

| EP | 1923778 | 5/2008 |
| WO | 2005/057392 | 6/2005 |
| WO | 2007/094894 | 8/2007 |

OTHER PUBLICATIONS

Apple, "iPhone User Guide: For iPhone and iPhone 3G," Jul. 11, 2008 pp. 1-154.
Extended European Search Report dated Feb. 23, 2010 issued by the European Patent Office for European Patent Application No. 09173506.8 corresponding to this application (U.S. Appl. No. 12/581,515).

* cited by examiner

*Primary Examiner* — Andrey Belousov
(74) *Attorney, Agent, or Firm* — H.C. Park & Associates, PLC

(57) ABSTRACT

A method and system for configuring an idle screen with an extended virtual area and for displaying a variety of contents on the idle screen extended by the virtual area is described. The method includes providing an idle screen that displays at least one content, and providing a virtual area that extends the idle screen and displays contents. The method may further include checking the settings of the virtual area when the virtual area is provided, and providing, if the virtual area is set, the idle screen extended by the virtual area where contents are provided by the extended idle screen.

33 Claims, 20 Drawing Sheets

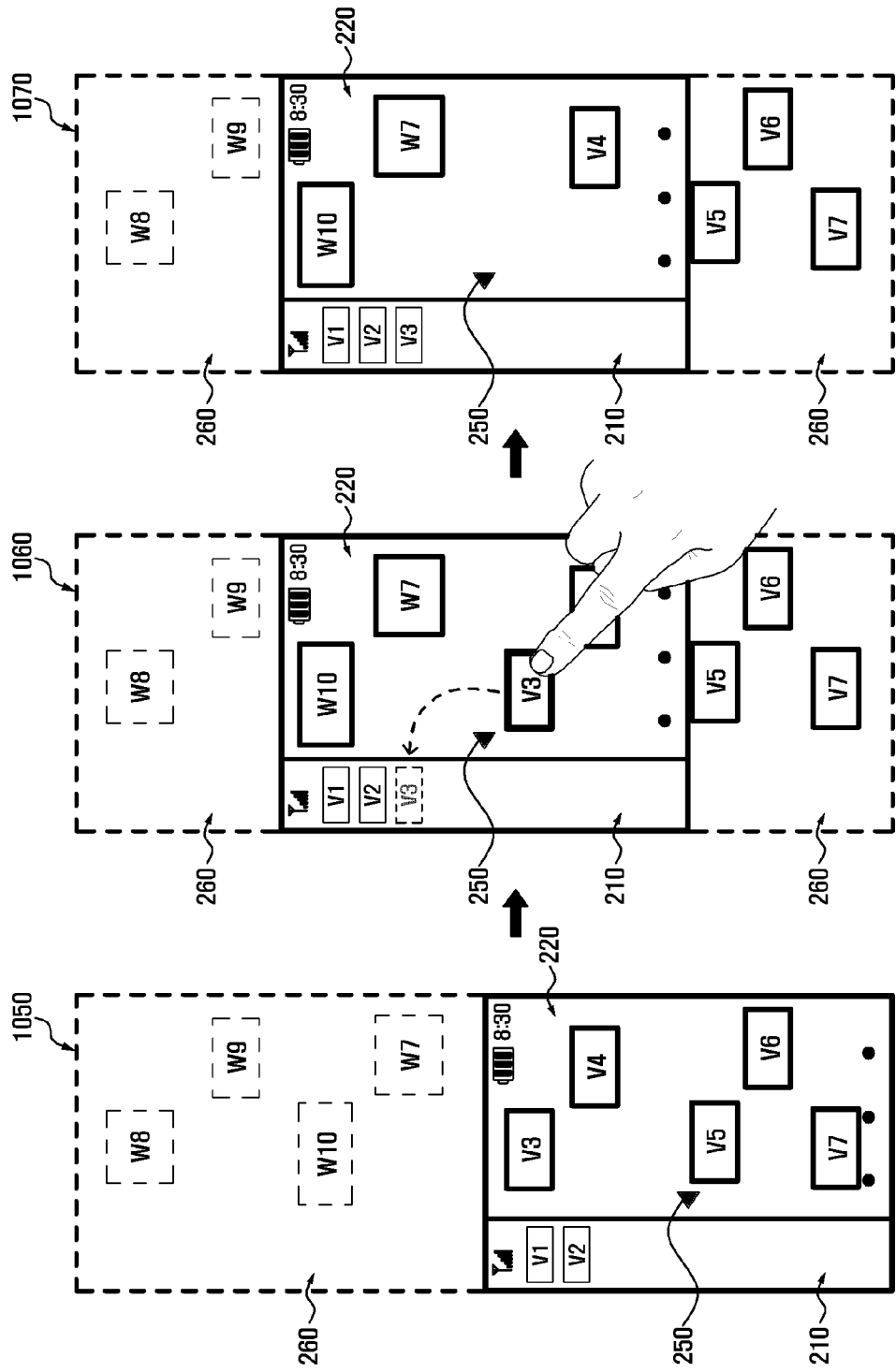

METHOD AND SYSTEM FOR CONFIGURING AN IDLE SCREEN IN A PORTABLE TERMINAL

CROSS REFERENCE TO RELATED APPLICATION

This application claims priority from and the benefit of Korean Patent Application No. 10-2008-0102381, filed on Oct. 20, 2008, which is hereby incorporated by reference for all purposes as if fully set forth herein.

BACKGROUND OF THE INVENTION

1. Field of the Invention

Exemplary embodiments of the present invention relate to a portable terminal, and to a method and system to overcome a spatial limitation of an idle screen of a portable terminal.

2. Description of the Background

In recent years, portable terminals have been developed to serve as multimedia is devices that can provide a variety of functions, such as, for example, an electronic note function, gaming functions, and a schedule management function. To use a variety of additional functions, portable terminals may be equipped with user interfaces.

A touch screen is an example of a user interface that can allow a portable terminal user to conveniently use various functions. A touch screen may refer to a display device having a panel that may be touched with the user's finger or a touch pen, and may output a signal corresponding to the tapped portion. For example, if the portable terminal is equipped with a touch screen and the user taps a portion on the touch screen, the portable terminal may recognize the tapped portion and may execute a command corresponding to the tapped portion.

Touch screens may be configured in various ways, such as, for example, being a pressure detection type, an electrostatic type, and/or an infrared light detection type of touch screen. The pressure detection type of touch screen may respond to a pressure applied to the touch screen. The electrostatic type of touch screen may identify a tapped portion by detecting a loss of charge. The infrared light detection type of touch screen may identify a tapped portion by detecting when infrared light is blocked.

Portable terminals may conventionally be relatively small in size, and thus their display screen may be small. An idle screen is a display screen in a portable terminal and may also be small. Conventional portable terminals are disadvantages in that a variety of contents may not be configured or displayed on the idle screen.

Therefore, a method is needed to allow a variety of contents to be configured on the idle screen of the portable terminal. A user interface is also required to freely edit and arrange the contents on the idle screen of the portable terminal, according to user preference.

SUMMARY OF THE INVENTION

Exemplary embodiments of the present invention provide a portable terminal, and a method and system to overcome a spatial limitation of an idle screen of the portable terminal.

Additional features of the invention will be set forth in the description which follows, and in part will be apparent from the description, or may be learned by practice of the invention.

Exemplary embodiments of the present invention disclose a method for configuring an idle screen in a portable terminal, including: providing an idle screen that displays at least one content; and providing a virtual area that extends the idle screen and displays contents corresponding to a user's settings. The method may further include: checking the state of the settings of the virtual area when the virtual area is provided; and providing, if the virtual area is set, the idle screen extended by the virtual area, where contents are provided to the extended idle screen.

Exemplary embodiments of the present invention disclose a portable terminal including: a display unit provided with an idle screen for displaying at least one content and a virtual area that extends the idle screen; a storage unit for storing setting information related to a function of the virtual area and arrangement information regarding contents arranged on the virtual area; and a controller for controlling the scrolling of the virtual area and the arrangement of the contents according to the scroll control of the virtual area, wherein the controller provides the idle screen extended by the virtual area through an idle screen layer providing the idle screen and a virtual area layer providing the virtual area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 10A and FIG. 10B illustrate screens showing a process for arranging a particular widget in a virtual area, according to exemplary embodiments of the present invention.

DETAILED DESCRIPTION OF THE ILLUSTRATED EMBODIMENTS

Figure 1A:
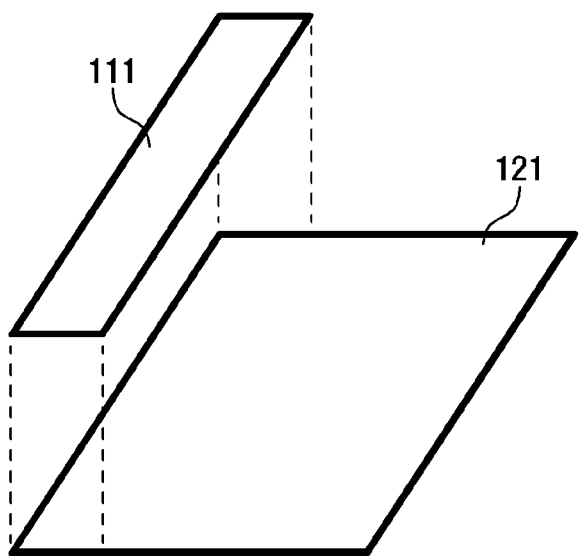
FIG. 1A, FIG. 1B, and FIG. 1C illustrate a widget function and a method for configuring an idle screen in a portable terminal according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. Detailed descriptions of well-known functions and structures incorporated herein may be omitted to avoid obscuring the subject matter of the present invention.

Prior to explaining exemplary embodiments of the present invention, relevant terminology will be defined for the description below.

Contents may correspond to various types of items arranged on an idle screen of a portable terminal. Contents may include a shortcut icon or widget that can directly execute a particular menu in the portable terminal without processing a start-up of the menu. Content may be executed based on a widget.

A widget may refer to a graphic user interface (GUI) that displays an application program executed on the portable terminal or, in general, in a computer. The widget may be displayed on an idle screen with a variety of shapes and may provide a variety of functions. A widget may, in some cases, refer to a mobile widget. The mobile widget is an application program operated in a portable terminal. The mobile widget may refer to an application program that can operate on one widget engine, or on an idle screen of a portable terminal.

In the following description, a method for configuring a general idle screen using a widget is explained with reference to FIG. 1A, FIG. 1B, and FIG. 1C.

Figure 1B:
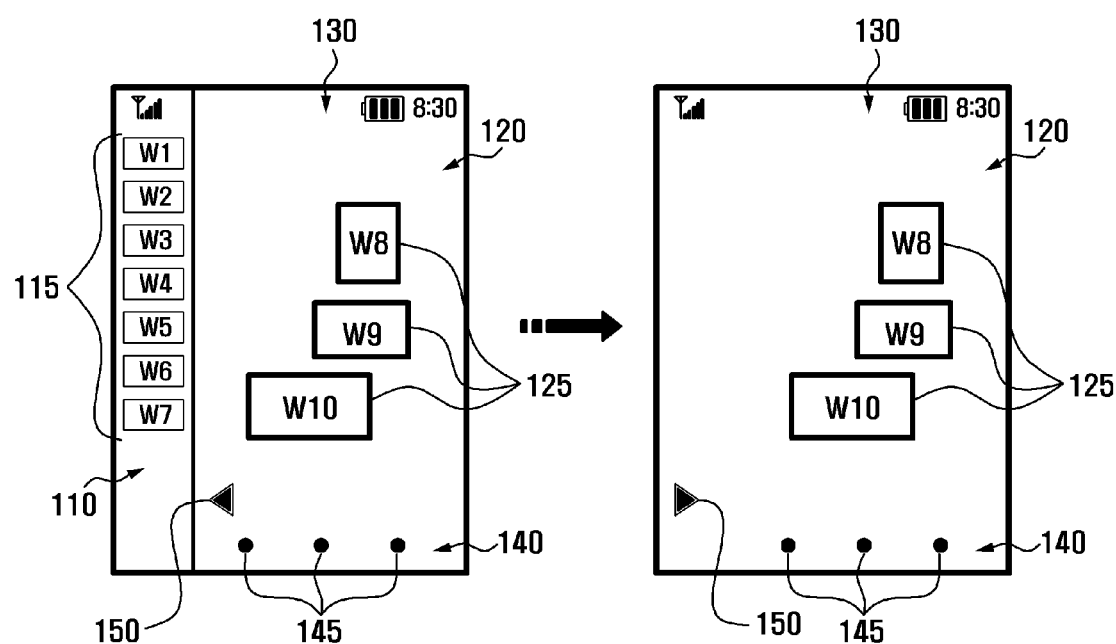
Figure 1C:
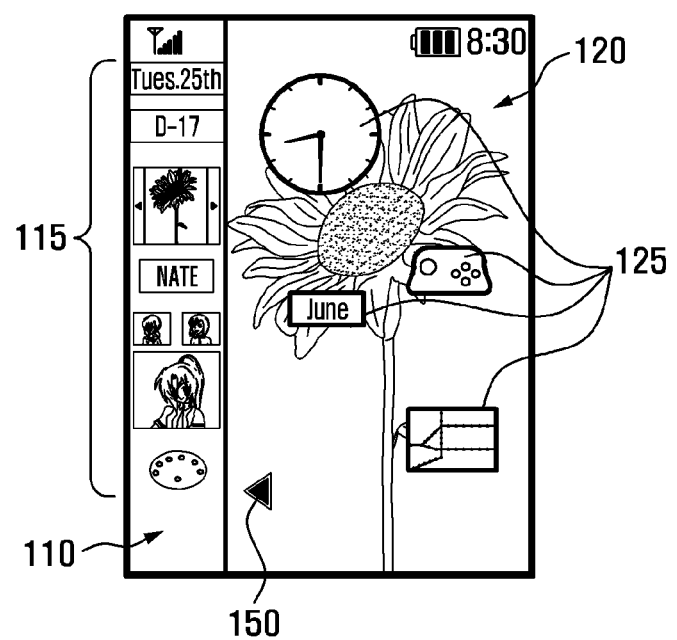

FIG. 1A, FIG. 1B, and FIG. 1C are views that describe a widget function and a method for configuring an idle screen in a portable terminal.

Referring to FIG. 1A, FIG. 1B, and FIG. 1C, the portable terminal may include a plurality of widget icons 115 for calling widgets that can execute preset functions, a tray 110 on which the plurality of widget icons 115 may be arranged, an idle screen 120 serving as a main display area of the portable terminal, a scroll indicator 150 for marking or removing the tray 110, at least one submenu 145 for executing frequently used functions in the portable terminal, a submenu display area 140 for displaying the submenu 145, and an indicator area 130 for displaying information related to a received signal strength indicator, remaining battery information, time information, and information regarding function executing states of the portable terminal. The idle screen 120 may display data of a screen on which the plurality of widgets are arranged.

As shown in FIG. 1A, the portable terminal may include an idle screen layer 121 for providing an idle screen 120, and a tray layer 111 for providing a tray 110 containing a plurality of widget icons 115.

The idle screen 120 may refer to an area that is formed on the idle screen layer 121. The idle screen 120 may allow a user to execute a function of a particular widget, and may display the result of the executed function. The idle screen 120 may display a particular image or a particular color according to the user's setting.

As shown in FIG. 1A, FIG. 1B, and FIG. 1C, when a portable terminal user moves a particular widget icon from the tray 110 to the idle screen 120, the portable terminal may execute and display a widget 125 corresponding to the widget icon. When widget icons 115 of the tray 110 are moved to the idle screen 120, a function of a widget corresponding to the placed widget icon may be executed.

The tray 110 may be a user interface (UI) formed on the tray layer 111. A plurality of widget icons 115 may be displayed in the tray 110, so that the user can easily use a particular widget in the portable terminal. The tray 110 may be configured horizontally or vertically. In FIG. 1A, FIG. 1B, and FIG. 1C, the widget icons 115 are arranged in the vertical direction. The tray 110 may be located at one side of the idle screen 120. As shown in FIG. 1A, the tray 110 may also be part of an addition tray layer 111 on the idle screen layer 121.

A widget icon 115 may be a picture, symbol, or icon representative of a function of the portable terminal. The portable terminal user can select a widget function to execute through a corresponding widget icon and can then execute the widget icon.

The scroll indicator 150 may be used to display or remove the tray 110 and can have a directivity corresponding to the display or removal. The scroll indicator 150 may be displayed by a symbol (e.g., triangle) pointing in a particular direction. The direction of the scroll indicator 150 may indicate a direction in which the portable terminal opens or closes the tray 110. The directions for opening and closing the tray 110 may be opposite (i.e., 180°). For example, in FIG. 1B, the first screen illustrates a scroll indicator 150 pointing in the left direction with a tray 110 displayed. However, in the second screen of FIG. 1B, the scroll indicator 150 is pointing in the right direction and the tray 110 is no longer displayed. The portable terminal user can open or close the tray 110 by tapping the scroll indicator 150.

The submenu 145 may allow the user to tap a frequently-used menu of the portable terminal in a one touch manner. Examples of submenu items in the submenu 145 correspond to a phone call item through which the portable terminal user can directly make a call, a phone book item through which the user can search for a phone number stored in the portable terminal, a message item through which the user can send a message or identify a received message, a menu item through which the user can enter a general menu mode, and an option item through which the user can execute an option for a particular function. It should be understood that various other submenu items may be provided by the submenu 145 and that the types of submenu items are not limited to the submenu items described above. For example, the submenu 145 may include a submenu item for deleting submenu items from the submenu 145 according to the user's choice or preference.

FIG. 1C illustrates an example of a portable terminal having an idle screen 120 with widget 125 and a tray 110 with a widget icon 115 that may be used to configure the idle screen 120 in FIG. 1A and FIG. 1B.

As shown in FIG. 1C, a plurality of widget icons 115 may be arranged on the tray 110 in the vertical direction. The functions of the portable terminal, corresponding to the plurality of widget icons 115, may be related to a day, date, photo album, and/or wireless Internet online games. For example, as shown in FIG. 1C, on the idle screen 120, a current time display widget and a game widget may be executed.

As described above, the portable terminal user may drag and drop a widget icon from the tray 110 to the idle screen

120. The dropped widget icon may then be executed and a function corresponding to executed widget icon may be activated. The portable terminal user can configure the idle screen using the widgets, so that the user can conveniently use the functions of the portable terminal.

Widgets associated with the use of the portable terminal may also be displayed on the idle screen. For example, the widgets related to use modes (e.g., frequent places where the user uses a portable terminal, a pattern indicating how the user uses a portable terminal, and other user interests such as, health, beauty, stocks, sports, and education, may be provided in the idle screen 120.

As noted above, a display unit size is limited in conventional portable terminals. An idle screen may also be subjected to size limitations of the display unit. Therefore, due to the spatial limitation of the idle screen 120, it may be difficult to arrange all widgets that a user of the portable terminal wishes to display.

A virtual area may be provided with the idle screen 120. The virtual area may extend an idle screen 120 to overcome the spatial limitation of conventional idle screens in the portable terminal. A method for configuring idle screen using a virtual area, a user interface for controlling the idle screen, and controlling means is hereinafter described.

In the following description, user interfaces of a portable terminal, screens corresponding to the user interfaces, and associated operating methods are explained in detail.

FIG. 2A, FIG. 2B, FIG. 2C, FIG. 2D, FIG. 2E, FIG. 2F, and FIG. 2G illustrate user interfaces and a method for configuring an idle screen in a portable terminal using a widget set according to exemplary embodiments of the present invention. Detailed explanations of the same elements shown in FIG. 1A, FIG. 1B, and FIG. 1C will be omitted in the following description of FIG. 2A, FIG. 2B, FIG. 2C, FIG. 2D, FIG. 2E, FIG. 2F, and FIG. 2G.

Figure 2A:
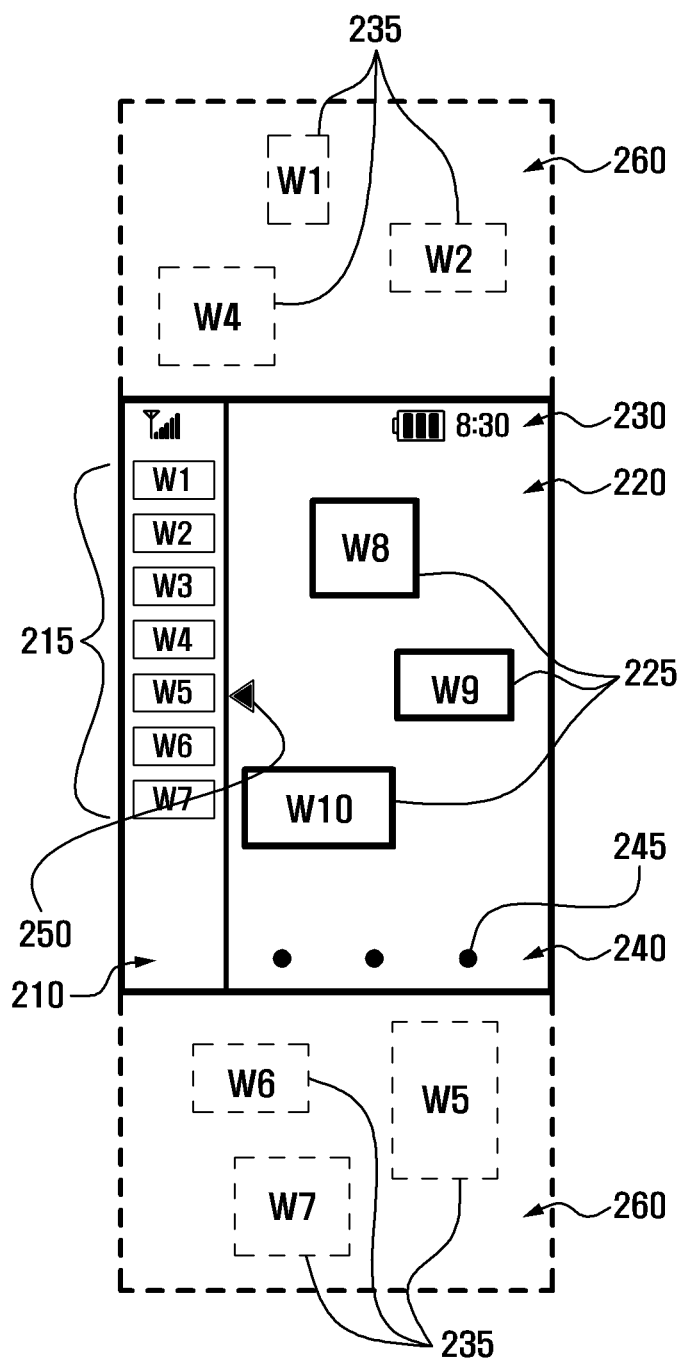
FIG. 2A, FIG. 2B, FIG. 2C, FIG. 2D, FIG. 2E, FIG. 2F, and FIG. 2G illustrate user interfaces and a method for configuring an idle screen in a portable terminal using a widget set, according to exemplary embodiments of the present invention.

FIG. 2A shows a screen when a tray 210 is in an open state, and FIG. 2B, FIG. 2C, FIG. 2D, FIG. 2E, and FIG. 2F show screens when a tray 210 is in a closed state.

Figure 2B:
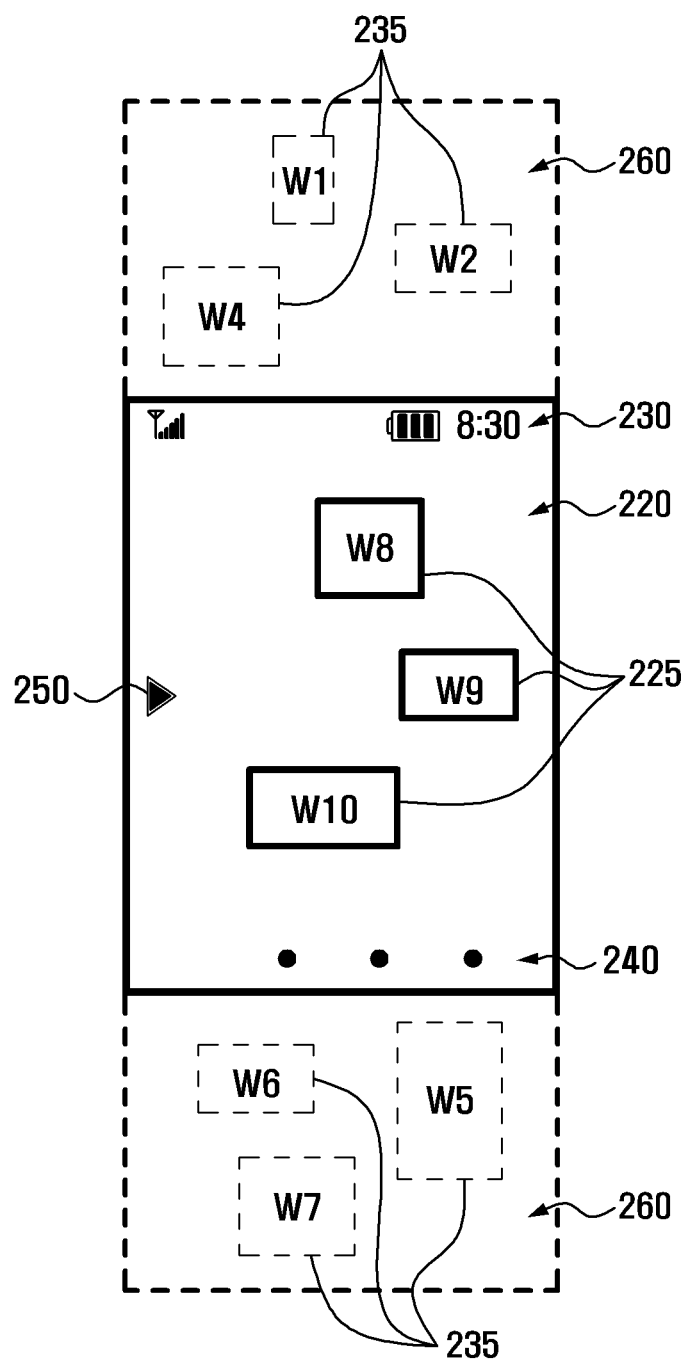
Figure 2C:
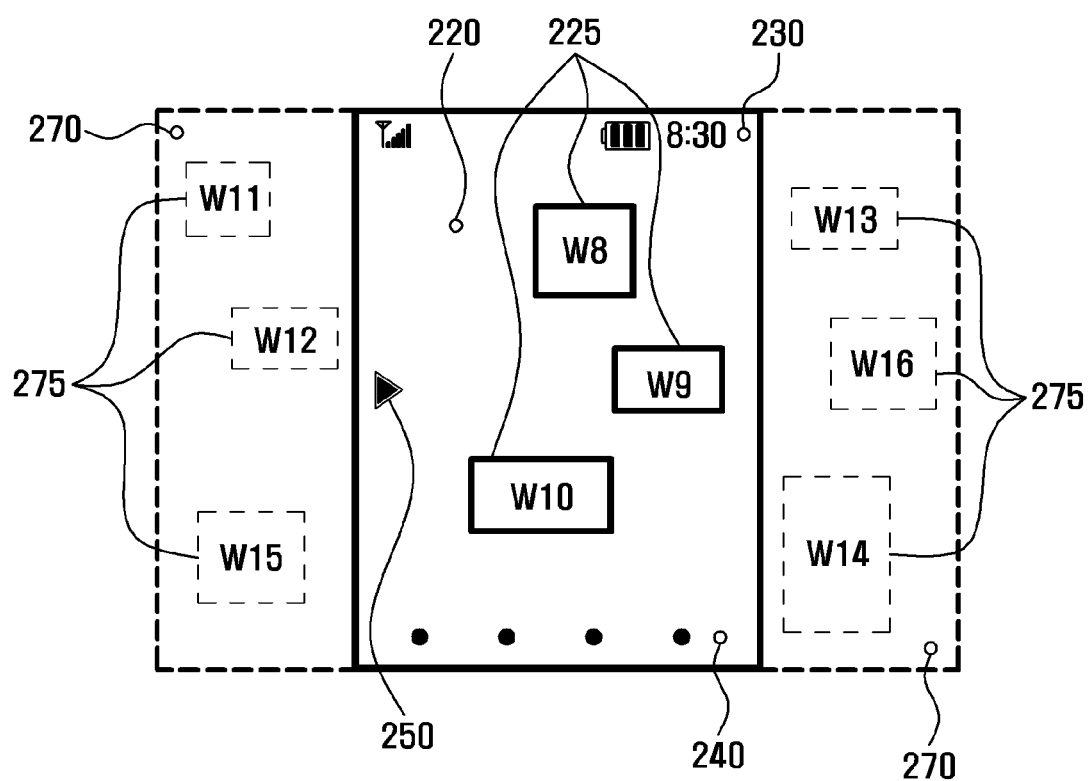
Figure 2D:
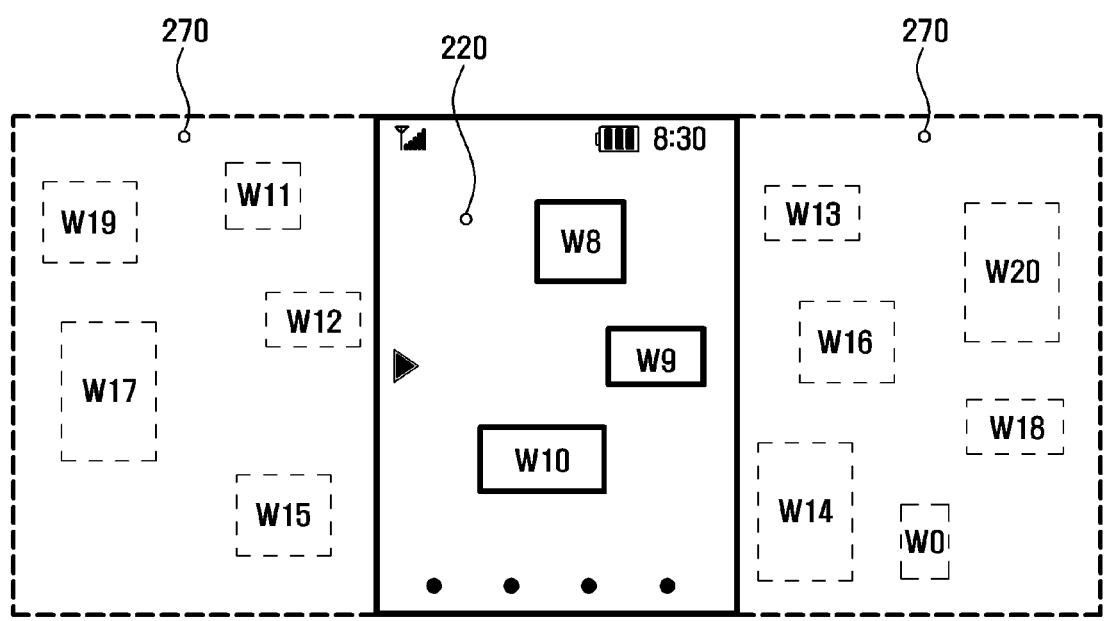
Figure 2E:
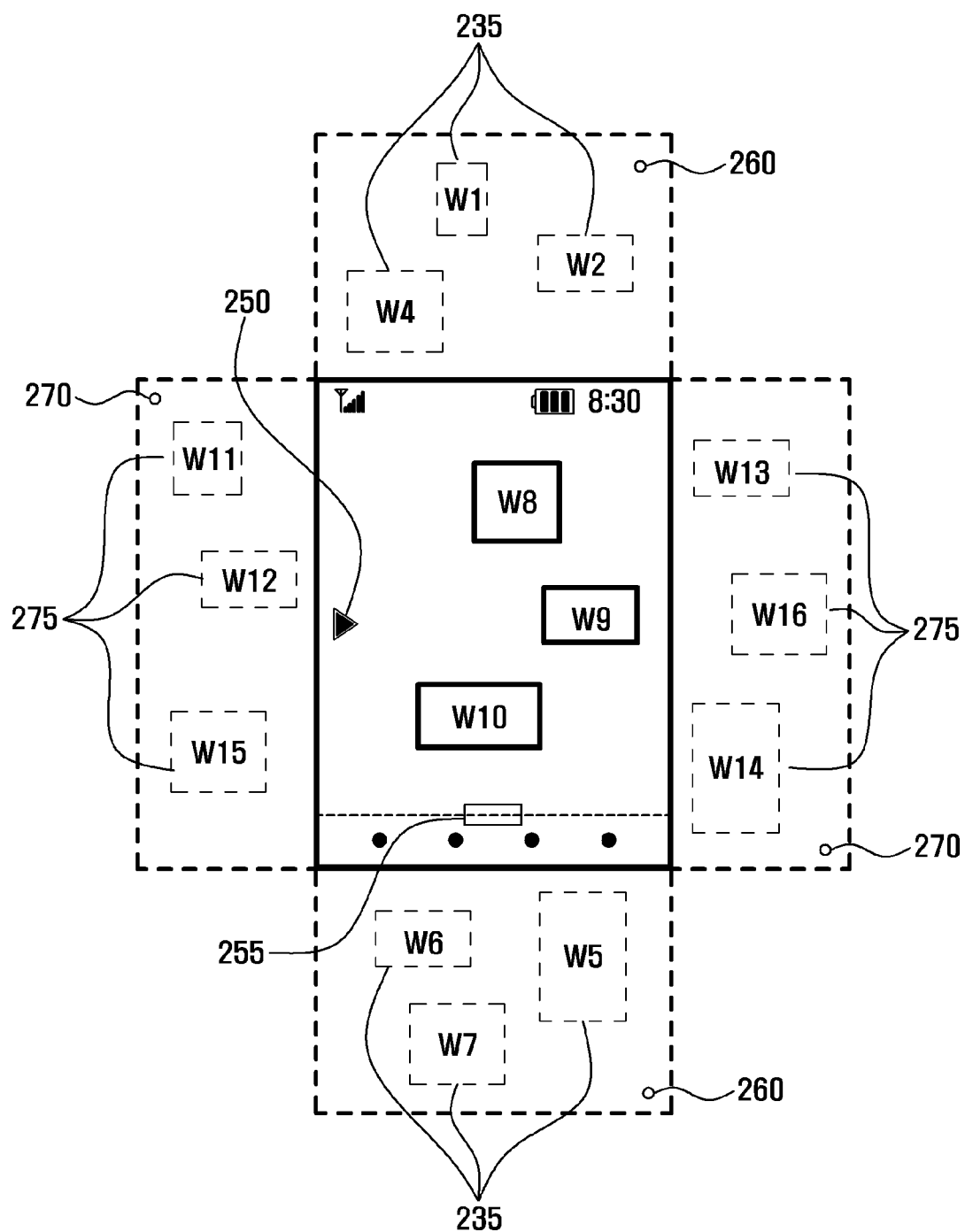
Figure 2F:
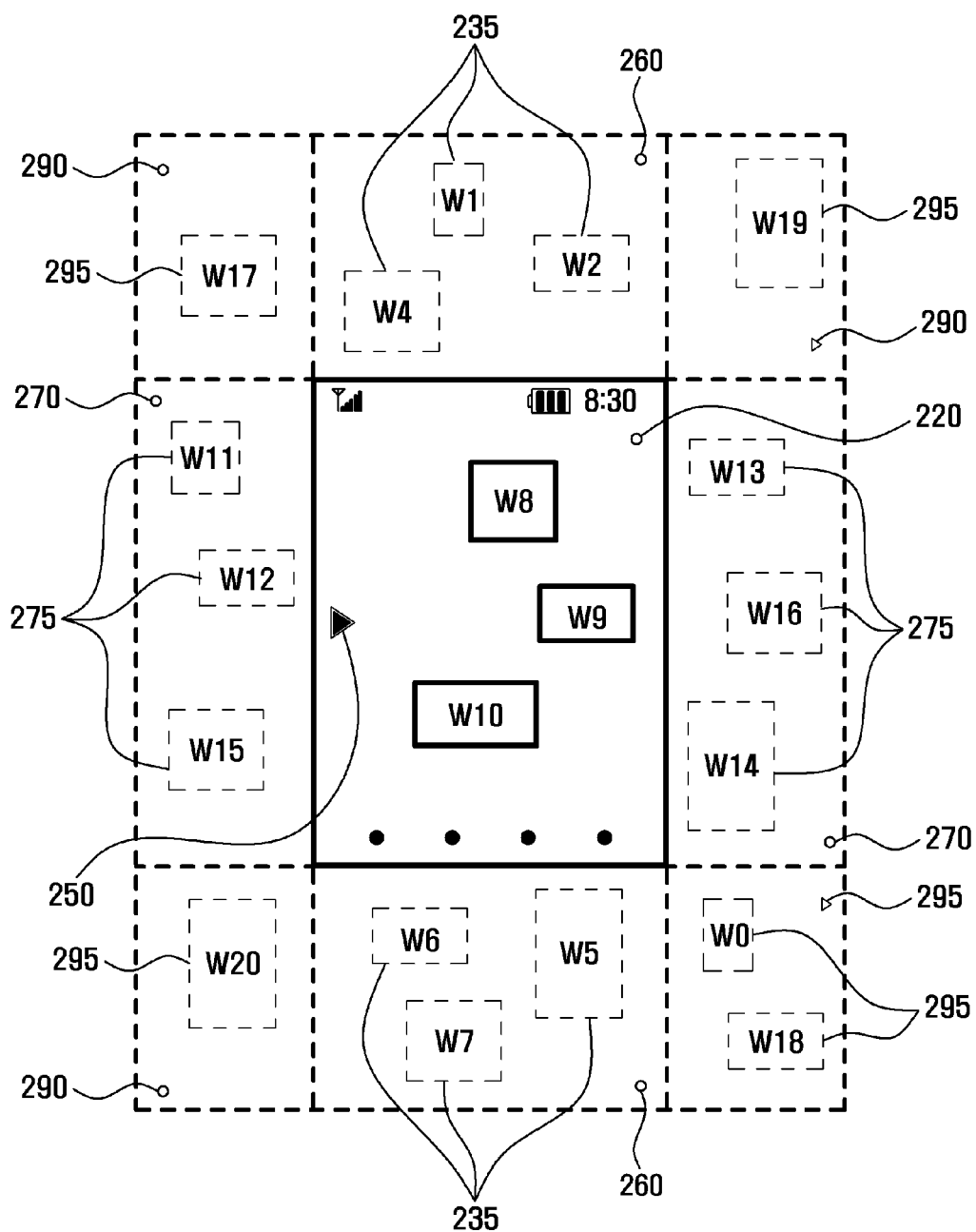

FIG. 2A and FIG. 2B show a screen where a virtual area 260 extends the idle screen in the vertical direction (i.e., the up and down directions). FIG. 2C and FIG. 2D show a screen where a virtual area extends the idle screen in the horizontal direction (i.e., the left and right directions). FIG. 2E shows a screen where virtual areas extend the idle screen in the vertical and horizontal directions (i.e., the up, down, left, and right directions). FIG. 2F shows a screen where virtual areas extend the idle screen all directions (e.g., the up, down, left, right, and diagonal directions).

Referring to FIG. 2A and FIG. 2B, the portable terminal may include a plurality of widget icons 215, a tray 210 for arranging the plurality of widget icons 215, an idle screen 220, widgets 225 displayed on the idle screen 220, an indicator area 230, a submenu 245, a submenu display area 240 for displaying the submenu 245, a scroll indicator 250, at least one virtual area 260 for extending the idle screen 220, and widgets 235 provided in the virtual area 260.

The virtual areas 260, as shown in FIG. 2A and FIG. 2B, may refer to areas on which widgets that are not displayed on the idle screen 220 are arranged. The virtual areas 260 may extend the idle screen 220. For example, the virtual areas 260 may correspond to areas that are extended from the idle screen 220 in the lengthwise direction (e.g., the up and down direction). The widgets 235 may be displayed differently on the virtual area 260 according to the position of virtual area 260 relative to the idle screen 220, as shall be explained in further detail below.

The scroll indicator 250 may be a scroll controller that can control the scrolling operations of the virtual area 260 on the extended idle screen. The scroll indicator 250 can be displayed at a relative location on the idle screen 220 with respect to the virtual area 260 and/or the size of the virtual area 260. The scroll indicator 250 can scroll through parts of the virtual areas 260 that do not appear on the idle screen 220 in any (e.g., up and down) direction, so that the widgets 235 arranged on the virtual area 260 can be located and displayed on the idle screen 220.

It should be understood that the scroll controller may be implemented in various ways and is not limited to being implemented by a scroll indicator 250. Furthermore, multiple scroll controllers may be used. Other methods to scroll through the virtual areas 260 may be used. Some of the methods to scroll through the virtual areas 260 are described in further detail below.

Referring to FIG. 2C and FIG. 2D, the portable terminal may include an idle screen 220, widgets 225 displayed on the idle screen 220, an indicator area 230, a submenu display area 240 for displaying a submenu, a scroll indicator 250, at least one virtual area 270 for extending the idle screen 220, and widgets 275 provided on the virtual area 270. A detailed description of elements already described with reference to FIG. 2A and FIG. 2B may be omitted in the following description.

In FIG. 2C and FIG. 2D, the virtual areas 270 may refer to areas on which widgets not displayed in the idle screen 220 are arranged. The virtual areas 270 may extend the idle screen 220 in the widthwise direction (i.e., the left and right direction). The virtual areas 270 shown in FIG. 2D are extended further than the virtual areas 270 shown in FIG. 2C. A size of the virtual area 270 can be variable as shown in FIG. 2C and FIG. 2D. The widgets 275 may be displayed differently on the virtual area 270 according to the position the virtual area 270 occupies on the idle screen 220.

In FIG. 2C and FIG. 2D, the scroll indicator 250 may be as a scroll controller that can control the scrolling operation of the virtual area 270 on the extended idle screen. When the scroll indicator 250 serves as the scroll controller, the location of the scroll indicator 250 on the idle screen 220 may be determined in proportion to the total size of the virtual area 270. The scroll indicator 250 can be displayed at a relative location on the idle screen 220 with respect to the virtual area 270. The scroll indicator 250 can scroll through parts of the virtual areas 270 that do not appear on the idle screen 220 in the left and right direction, so that the widgets 275 arranged on the virtual area 270 can be located and displayed on the idle screen 220.

It should be understood that the scroll controller may be implemented in various ways and is not limited to being implemented by a scroll indicator 250. Furthermore, multiple scroll controllers may be used. Other methods to scroll through the virtual areas 260 may be used. Some of the methods to scroll through the virtual areas 260 are described in further detail below.

Referring to FIG. 2E, the portable terminal may include an idle screen 220, widgets 225 displayed on the idle screen 220, a scroll indicator 250, virtual areas 260 and 270 for extending the idle screen 220, and widgets 235 and 275 arranged on the virtual areas 260 and 270, respectively. A detailed description of elements already described with reference to FIG. 2A, FIG. 2B, FIG. 2C, and FIG. 2D may be omitted in the following description.

Virtual areas 260 and 270 shown in FIG. 2E may refer to areas on which widgets not displayed on the idle screen 220 are arranged. The virtual areas 260 and 270 may extend the idle screen 220. As shown in FIG. 2E, virtual areas 260 correspond to areas extended from the idle screen 220 in the lengthwise direction, and virtual areas 270 correspond to areas extended from the idle screen 220 in the widthwise direction. The virtual areas 260 and 270 may extend the idle screen 220 in the up, down, left, and right directions, respectively. Accordingly, a portable terminal user can arrange a relatively large number of widgets on the idle screen 220 and the virtual areas 260 and 270. The widgets 235 and 275 may be displayed differently on the virtual areas 260 and 270 according to the respective positions occupied by the virtual areas 260 and 270 relative to the idle screen 220.

The scroll indicator 250 shown in FIG. 2E may serve as a scroll controller that can control the scroll operations through the virtual area 260 that extends the idle screen 220 in the up and down direction. A scroll bar 255 on the idle screen 220 may serve as a scroll controller that can control the scroll operations through the virtual areas 270 that extend from the idle screen 220 in the right and left direction.

Scroll indicator 250 can control the up and down scrolling operation of the virtual areas 260 to view at least part of the virtual areas 260 that do not appear on the idle screen 220. The scroll bar 255 can control the right and left scrolling operation of the virtual areas 270 to view at least part of the virtual areas 270 that do not appear on the screen 220. Through these scrolling operations, the widgets 235 and 275, arranged on the virtual areas 260 and 270, respectively, can be rearranged and displayed on the idle screen 220. The location of the scroll indicator 250 on the idle screen 220 can be determined in proportion to the total size of the virtual areas 260. The location of the scroll bar 255 on the idle screen 220 can be determined in proportion to the total size of the virtual areas 270. The scroll indicator 250 and the scroll bar 255 can be displayed at relative locations on the idle screen 220 with respect to the virtual areas 260 and 270, respectively.

It should be understood that scroll controllers may be implemented in various ways and are not limited to being implemented by a scroll indicator 250 or a scroll bar 255. Furthermore, multiple scroll controllers may be used. Other methods to scroll through the virtual areas 260 and 270 may be used. Some of the methods to scroll through the virtual areas 260 and 270 are described in further detail below.

Referring to FIG. 2F, a portable terminal may include an idle screen 220, a scroll indicator 250, virtual areas 260, 270, and 290 for extending the idle screen 220, and widgets 235, 275, and 295 provided to the virtual areas 260, 270, and 290, respectively. A detailed description of elements already described with reference to FIG. 1A, FIG. 1B, FIG. 2A, FIG. 2B, FIG. 2C, FIG. 2D, and FIG. 2E may be omitted in the following description.

Virtual areas 260, 270, and 290, as shown in FIG. 2F, may refer to areas on which widgets 235, 275, and 295 may be arranged. The virtual areas 260, 270, and 290 may extend the idle screen 220. As shown in FIG. 2F, the virtual areas 260 correspond to areas that can extend the idle screen 220 in the lengthwise direction. The virtual areas 270 correspond to areas that can extend the idle screen 220 in the widthwise direction. The virtual areas 290 correspond to areas that can extend the idle screen 220 in the diagonal direction. Accordingly, the virtual areas 260, 270, and 290 may extend the idle screen 220 in the up, down, left, right, and diagonal directions. Therefore, the portable terminal user can arrange a relatively large number of widgets on the idle screen 220 and the virtual areas 260, 270, and 290. The widgets 235, 275, and 295 may be displayed differently on the virtual areas 260, 270, and 290 according to the respective positions occupied by the virtual areas 260, 270, and 290 relative to the idle screen 220.

Scroll indicator 250, as shown in FIG. 2F, may serve as a scroll controller that can control the scroll operations through the virtual area 260 that extends the idle screen 220 in the up and down direction. The scroll indicator 250 may also control display of the tray 220 on the screen as described above. Therefore, to provide scroll control convenience with respect to the up, down, left, right, and diagonal directions, the scroll control of the virtual areas 260, 270, and 290 can be performed by manipulating a widget of the idle screen 220 or a user's gesture generated on an empty area of the idle screen 220, as shall be explained in further detail below.

Figure 2G:
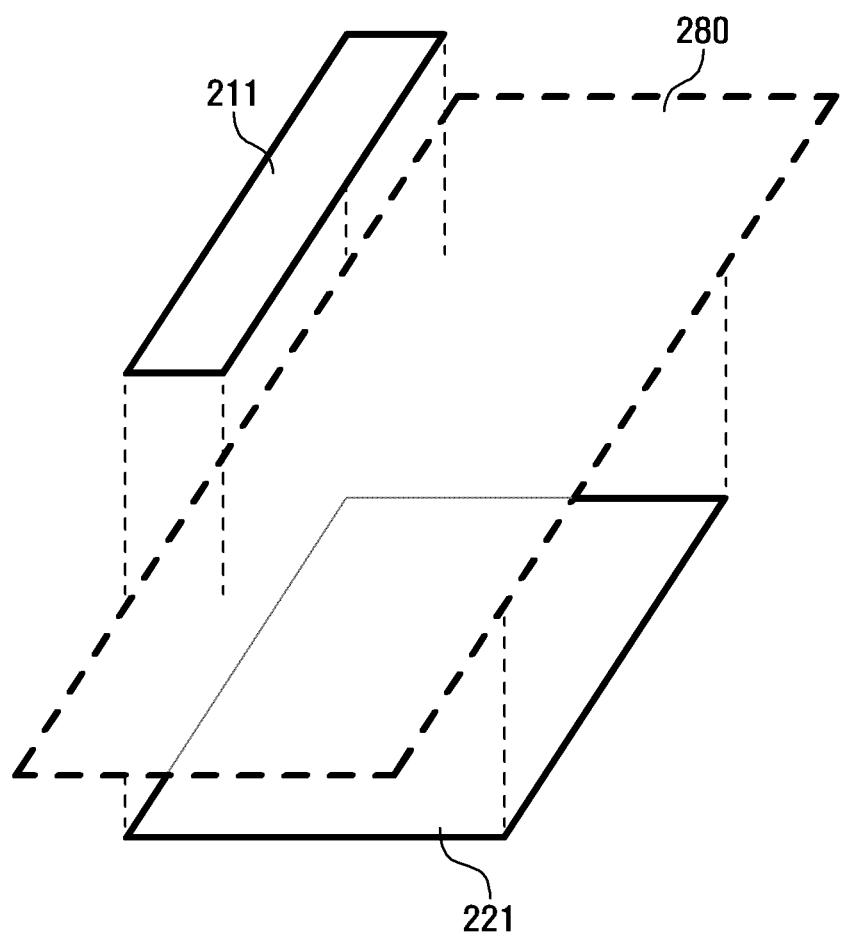

Referring to FIG. 2G, an idle screen layer 221 may provide an idle screen 220, a tray layer 211 may provide the tray 210 containing the widget icons 215 on the idle screen 220, and a virtual area layer 280 may provide virtual areas 260, 270, and 290 that extend the idle screen 220. The virtual area layer 280 may correspond to the virtual area 260 extending the idle screen 220 in the up and down direction. In some cases, the virtual area layer 280 may be configured to correspond to a virtual area extending the idle screen 220 in the right and left direction, a virtual area extending the idle screen 220 in the up, down, right, and left directions, or a virtual area extending the idle screen 220 in all directions.

As shown in FIG. 2G, the virtual area layer 280 may be a layer that corresponds to the virtual area 260 and may extend the idle screen 220. The virtual area layer 280 may provide at least one widget 235 thereon according to the portable terminal user's choice. In some cases, the virtual area layer 280 may be larger than the idle screen 220. In general, the virtual area layer 280 may be any suitable size. Although the virtual area 260 extends the idle screen 220 in the up and down direction as shown in FIG. 2G, it should be understood that the present invention is not limited thereto. As described above, the virtual area may extend the idle screen 220 in the right and left direction, the up, down, right, and left direction, and/or in all directions. The extension of the virtual area 260 with respect to the idle screen 220 can be defined according to the shape of the virtual area layer 280.

The virtual area 260 may be scrolled up and down according to the scroll control of the scroll indicator 250. The location and arrangement of widgets 225 may change as the virtual area 260 is scrolled. That is, according to the scroll operations of the virtual area 260, the widgets 225 arranged on the idle screen 220 may move up or down and may not be displayed on the idle screen 220. The widgets 235 may also be moved on to the idle screen 220 from the virtual area 260 and then displayed on the idle screen 260.

Figure 3:
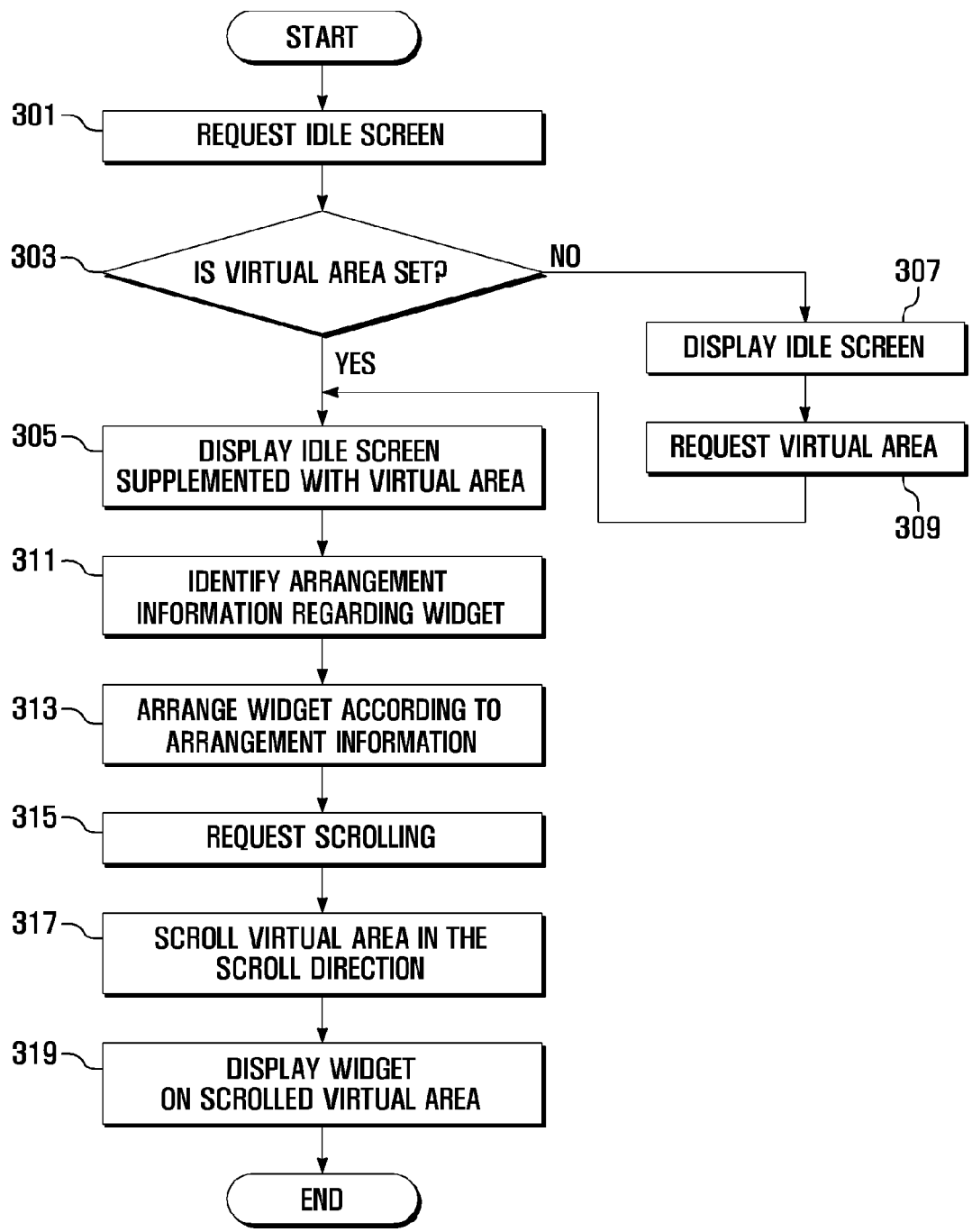
FIG. 3 is a flow chart describing a method for configuring an idle screen in a portable terminal according to exemplary embodiments of the present invention.

FIG. 3 is a flow chart describing a method for configuring an idle screen in a portable terminal according to exemplary embodiments of the present invention.

Referring to FIG. 3, when the portable terminal detects an idle screen request (301), the portable terminal may determine whether a virtual area 260 is set (303). The virtual area 260, as shown in FIG. 2A to FIG. 2F, may be an area that extends from the idle screen of the portable terminal and may be called an extended area. The virtual area 260 can arrange a plurality of widgets that do not appear on the idle screen 220.

If the portable terminal ascertains that a virtual area 260 has been set at 303, the portable terminal may display the idle screen 220 supplemented with at least one virtual area (305). On the contrary, if the portable terminal ascertains that a virtual area 260 has not been set at 303, the portable terminal may display a general idle screen (307). If the portable terminal receives a request to display a virtual area 260 (309)

while displaying a general idle screen, the portable terminal may display an idle screen as displayed at 305.

When the portable terminal displays an idle screen 220 in 305, the portable terminal may identify arrangement information regarding at least one widget (311). The portable terminal may arrange the at least one widget on the idle screen 220 and the virtual area 260 based on the arrangement information (313) and may display the widgets on the idle screen 220 accordingly. The idle screen 220 may display a certain number of widgets according to the arrangement information. Some widgets may not appear on the idle screen 220, as shall be explained in further detail below.

After displaying one or more widgets, when the portable terminal receives a scroll request (315), the virtual area 260 may be scrolled through according to the scroll direction (317). The scroll request may be a scroll request input by the user and may correspond to the movement of the scroll indicator on the idle screen 220. The scroll request may be a movement command that is generated after a widget is selected on the idle screen 220 and moved to the edge of the idle screen 220. The scroll request may be a gesture such as inputting a preset touch.

After scrolling the idle screen 220 through the virtual area 260 in the scroll direction at 317, the portable terminal may display corresponding widgets in the scrolled virtual area 260 on the idle screen 220 (319).

In the foregoing description, a method for configuring an idle screen in a portable terminal has been described in which the idle screen 220 may be extended by a virtual area 260 (e.g., the idle screen 220 can scroll through virtual area 260), widgets may be arranged in the idle screen 220 and the virtual area 260, and the virtual area 260 may be scrolled through. The virtual area 260 can be scrolled through when the tray 210 is in an open state and/or a closed state.

In the following description, a method for scrolling an idle screen through a virtual area is explained. Although the virtual area may be situated above and below (e.g., up and down) relative to the idle screen 220, it should be understood that virtual areas may be extended in the right and/or left directions, in the up, down, right and/or left directions, and in the up, down, right, left, and/or diagonal directions. In general, a virtual area may extend in any suitable direction with respect to the idle screen 220.

Figure 4:
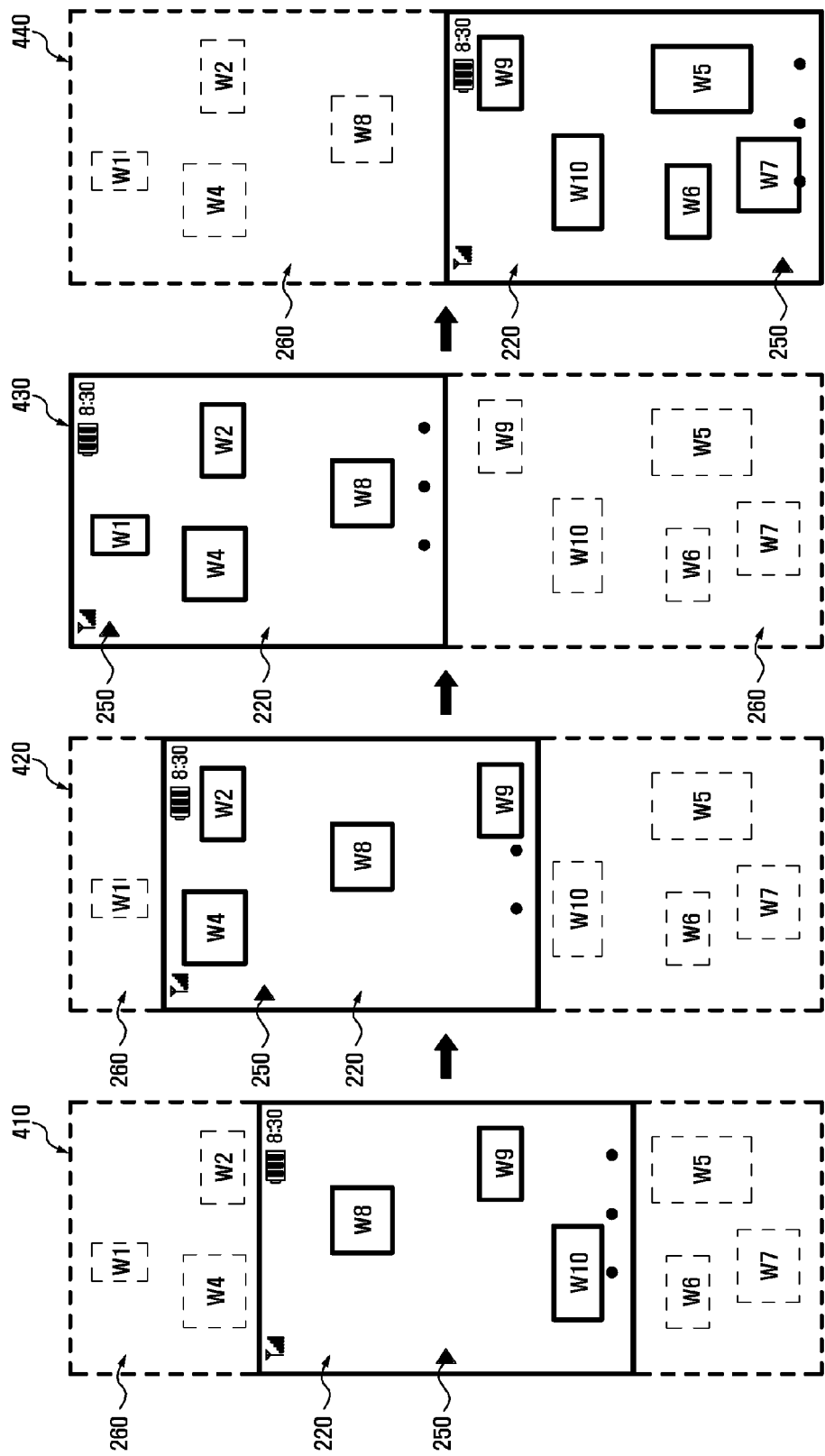
FIG. 4 illustrates screens in which an idle screen scrolls through a virtual area using a scroll indicator, according to exemplary embodiments of the present invention.

FIG. 4 illustrates screens in which an idle screen scrolls through a virtual area using a scroll indicator according to exemplary embodiments of the present invention.

Referring to FIG. 4, the portable terminal may configure an idle screen 220 as a default screen and a virtual area 260 that extends the idle screen 220, and may arrange a plurality of widgets on the idle screen 220 and the virtual area 260. A scroll indicator 250 may be displayed on the idle screen 220. The scroll indicator 250 may open or close a tray 210. The direction (e.g., facing left or right) of the scroll indicator 250 may be based on whether the tray 210 is opened or closed.

The scroll indicator 250 may serve as a scroll controller for controlling the virtual area 260. As shown in FIG. 4, the scroll indicator 250 can be displayed at a relative location on the idle screen 220. For example, as shown in screens 410, 420, 430, and 440, the scroll indicator 250 may be located at a relative position on the idle screen 220 in proportion to a scrolled distance through the virtual area 260.

As shown in FIG. 4, the scroll indicator 250 may be used to scroll through the virtual area 260. As the scroll indicator 250 is used to adjust a position of the idle screen 220, the widgets may be rearranged and displayed.

For example, when the portable terminal displays a screen 410, the user can input a signal via the scroll indicator 250 to adjust a position of the idle screen 220. The idle screen 220 can be moved (scrolled) in the up or down direction. For example, if the scroll indicator 250 is scrolled upward, the portable terminal may display the idle screen 220 and the virtual area 260 shown in screens 420 and 430. As indicated in screens 410, 420, and 430, the scroll indicator 250 may move upward if the idle screen is scrolled upward. If, for example, the scroll indicator 250 is scrolled downward, the portable terminal may display the idle screen 220 and the virtual area 260 as shown in screen 440 relative to screen 430. The scroll indicator 250 may then be located at the bottom portion on the idle screen 220 as illustrated in screen 440.

In more detail, an initial idle screen 220 may display widgets W8, W9, and W10, as shown in screen 410. Widgets may be moved out of the idle screen 220 or into the idle screen 220, as shown in screens 420, 430, and 440. For example, as the idle screen 220 is scrolled upward in screen 410, widgets W4 and W2, in addition to widgets W8 and W9 are displayed on the idle screen 220, as shown in screen 420 (widget W10 has been removed and is no longer displayed on idle screen 220). As the idle screen 220 is further scrolled upward, widgets W1, W4, W2, and W8 may be displayed on the idle screen 220 as shown in screen 430, and widget W9 may be removed from the idle screen 220. If the idle screen 220 is moved downward, widgets W9, W10, W6, W5, and W7 may be displayed on the idle screen 220, and widgets W1, W2, W4, and W8 may be removed from the idle screen 220.

Referring to screens 410 to 440, scroll control of the scroll indicator 250 may be performed by directly tapping the scroll indicator 250 on the idle screen 220. The touch event of the scroll indicator 250 can be generated by a gesture such as, for example, a user's finger touching and dragging the scroll indicator 250 on the idle screen 220 or by the user's finger touching and flicking the scroll indicator 250. If the display unit of the portable terminal is implemented by a touch screen, the scroll indicator 250 can be controlled by a variety of input gestures. For example, operating keys, such as direction keys, can control the scroll indicator 250. The scroll indicator 250 can be selected and up or down movements may be indicated by operating keys on the keypad.

Figure 5:
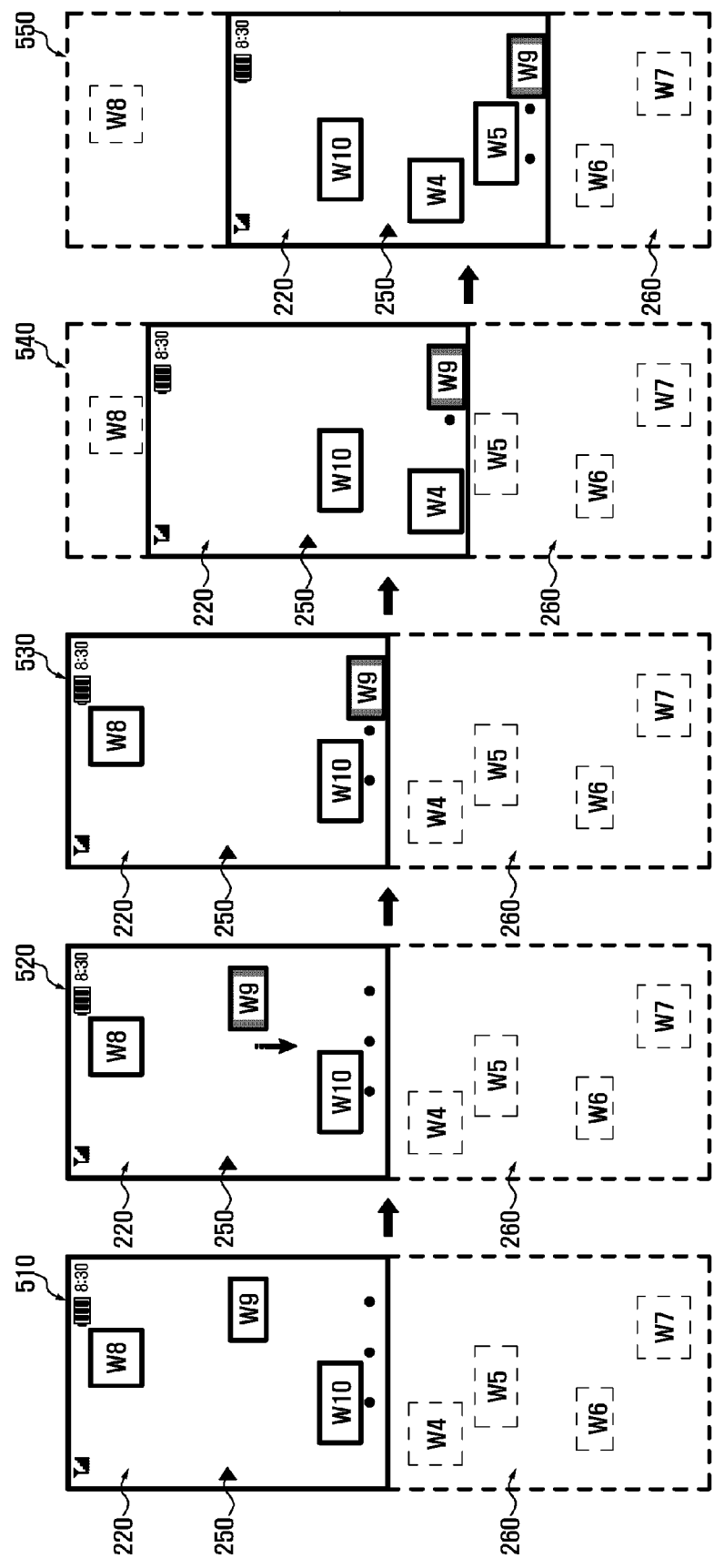
FIG. 5 illustrates screens in which an idle screen scrolls though a virtual area using a widget that is displayed on the idle screen, according to exemplary embodiments of the present invention.

FIG. 5 illustrates screens in which an idle screen scrolls though a virtual area using a widget that is displayed on the idle screen according to exemplary embodiments of the present invention.

Referring to FIG. 5, the portable terminal may display an idle screen 220 as a default screen and configure a virtual area 260 that extends from the idle screen 260. The portable terminal may arrange a plurality of widgets on the idle screen 220 and the virtual area 260. A scroll indicator 250, as described above, may be displayed on the idle screen 220.

As shown in screens 510, 520, 530, 540, and 550, the virtual area 260 can be scrolled through using a widget, for example, W9. Scrolling the virtual area 260 using a widget (e.g., W9) may change the location of the widget (e.g., W9).

As shown in screen 520, a portable terminal user can select a widget, for example, W9, to change the arrangement of the idle screen 220. The user can then move the widget W9 to a lower edge of the idle screen 220 as shown in screen 530.

When the user releases the selection of the widget W9 on screen 530, the widget W9 may be stored and saved at the position of release. The portable terminal may store and update the arrangement information for all widgets.

If the user continues to move the widget W9 toward the lower edge and maintains the selection of widget W9 as shown in screen 530, the portable terminal may determine that the motion corresponds to a scroll request. While the widget W9 is in a hold state (e.g., the widget is selected, pressed, and held at the lower edge of the idle screen 220), the portable terminal may control scrolling through the virtual area 260 as shown in screens 540 and 550. When the user releases the widget W9 as shown in screen 550, the widget W9 may be stored and saved at the position of release.

As described above, the idle screen 220 and virtual area 260 can be controlled by a widget on the idle screen 220. The user-selected widget (e.g., W9) can be controlled by a combination of keys. For example, the widget W9 can be selected by using direction keys and a selection key. The widget W9 can then be moved to the lower edge of the idle screen 220 using the direction keys. The idle screen 220 may then scroll through the virtual area 260. The selection of the widget W9 may be released according to the user's choice. The widget W9 can also be moved right and left by using the direction keys.

As shown in FIG. 5, the controlling operation of the particular widget W9 can be achieved by directly tapping the widget W9 on the idle screen 220. For example, in a portable terminal having a touch screen, the user can directly tap and select the widget W9 with the user's finger (or pen), and move the selected widget W9 to the lower edge of the idle screen 220 by a drag gesture. The user may then hold the drag gesture for the widget W9 at the lower edge of the idle screen 220 to scroll through the virtual area 260. The widget W9 can be moved up and down, or right and left using up, down, right, and left drag gestures, and arranged accordingly.

In FIG. 5, widget W9 is moved to the bottom (e.g., lowest) end of the idle screen 220 to scroll through the virtual area 260. However, it should be understood that exemplary embodiments are not limited thereto. For example, a widget may be moved to the top most (e.g., highest) end of the idle screen 220 and the idle screen 220 may move upward through the virtual area 260. If a virtual area is extended to the right and left relative to the idle screen, right and left scroll control of the virtual area can be performed. If a virtual area is extended in the up, down, right, and left direction or in the up, down, right, left, and diagonal directions with respect to the idle screen, the scroll control of the virtual area can be performed in a corresponding direction by a gesture of up, down, right, left, upper right, upper left, lower right, and/or lower left motions.

Figure 6:
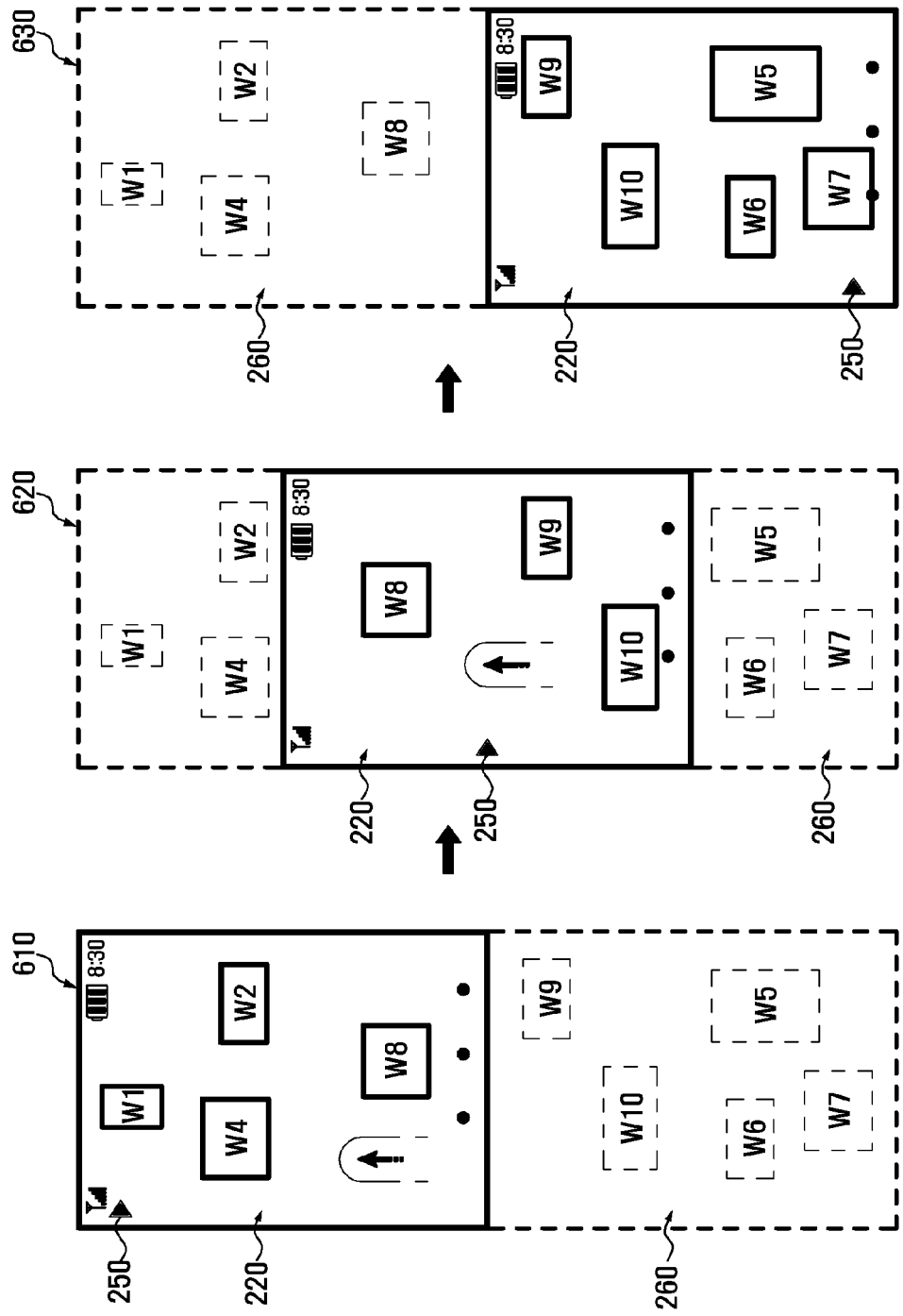
FIG. 6 illustrates screens in which an idle screen scrolls through a virtual area by touching an idle screen, according to exemplary embodiments of the present invention.

FIG. 6 illustrates screens in which an idle screen scrolls through a virtual area by touching an idle screen, according to exemplary embodiments of the present invention.

Referring to FIG. 6, the portable terminal may display an idle screen 220 as a default screen, and configure a virtual area 260 that extends the idle screen 260. A plurality of widgets may be arranged on the idle screen 220 and the virtual area 260. As described above, a scroll indicator 250 may be displayed on the idle screen 220.

As shown in screens 610, 620, and 630, the virtual area 260 can be scrolled through by a touch input. The touch input can be input to an empty area on the idle screen 220 on which a particular widget is not arranged. The touch input can be generated by a drag gesture or a flick gesture. The input unit of the portable terminal can be implemented with a touch screen or a touch pad.

As shown in screens 610, 620, and 630, when the portable terminal user taps an empty area on the idle screen 220, for example, in the upper direction, the portable terminal may scroll through the virtual area 260 in the corresponding direction (e.g., upper direction) in response to the user's touch input. As the idle screen 220 scrolls through the virtual area 260 in one direction (e.g., the upper direction), the scroll indicator 250 may move in a corresponding direction (e.g., upper direction) and distance on the idle screen 220. The distance may be proportional to the scrolled distance of the virtual area 260.

When a touch input is generated at the lower portion of the idle screen 220 in the upper direction, the virtual area 260 may be moved to the lower side of the idle screen 220 as shown in screen 610. The location of the virtual area 260 may be based on a location of the scroll indicator 250 on the idle screen 220. In some case, if, for example, a touch input is generated at an upper portion of the idle screen 220, in the lower direction, the portable terminal may ignore the touch input or may output a pop-up message window indicating that the touch input has failed.

If the virtual area 260 is extended to the right and left, a right and left scroll control can be performed by touching the idle screen 220 with a drag gesture in the right or left direction. Furthermore, if the virtual area 260 is extended in the up, down, right, and left direction or in the up, down, right, left, and diagonal direction, the scroll control can be performed in a corresponding direction by touching (e.g., drag gesture) the idle screen in the up, down, right, left, upper right, upper left, lower right, or lower left direction.

Figure 7:
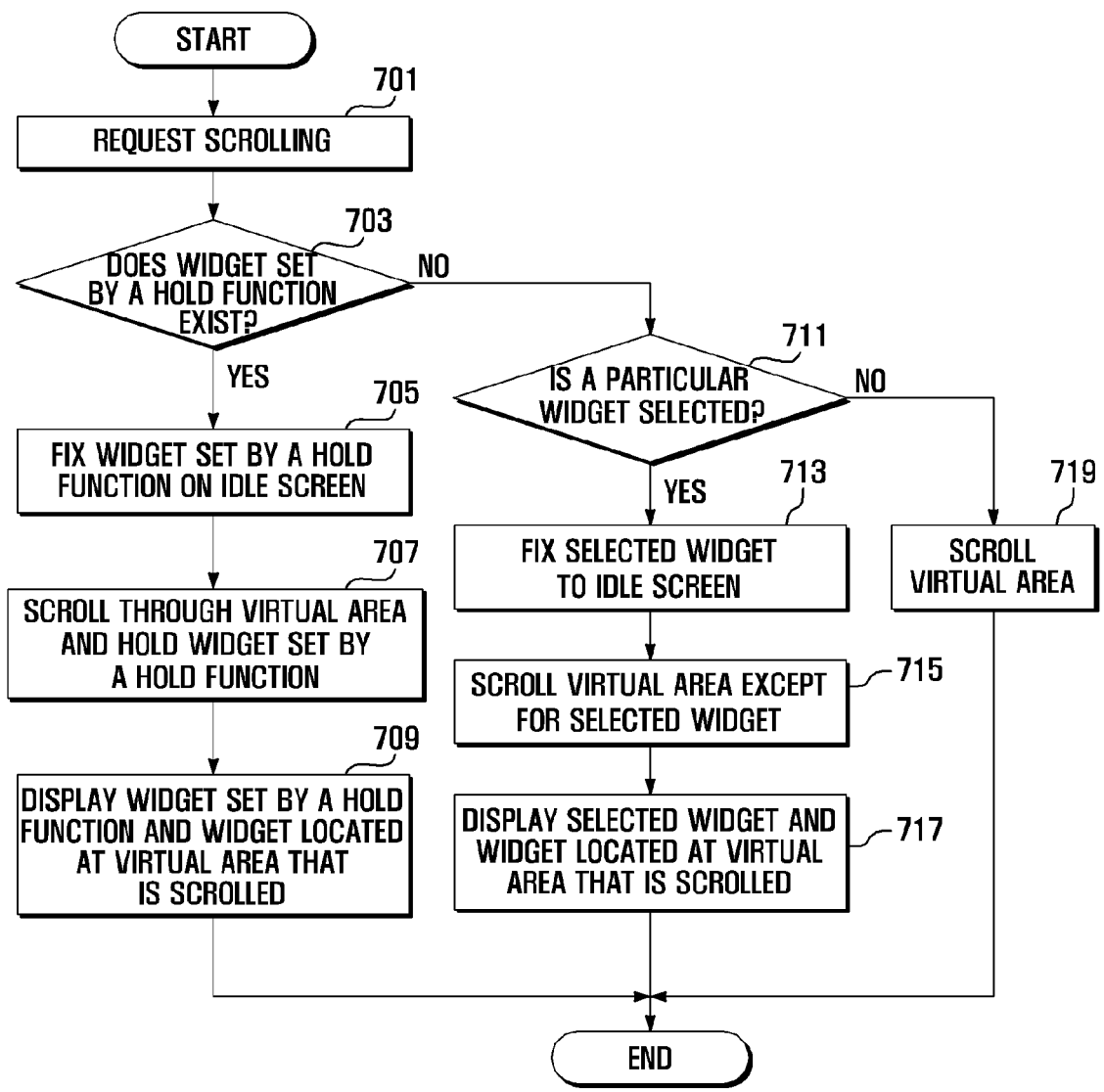
FIG. 7 is a flow chart describing a method for scrolling through a virtual area in a portable terminal according to exemplary embodiments of the present invention.

FIG. 7 is a flow chart describing a method for scrolling through a virtual area in a portable terminal using a widget set by a hold function or a widget selected by a scroll control according to exemplary embodiments of the present invention.

Referring to FIG. 7, when a portable terminal receives a scroll request (701), the portable terminal may determine whether a widget set by a hold function (e.g., a hold widget) exists (703). If the portable terminal determines that no widget is set by a hold function at 703, the portable terminal may then determine whether a particular widget is selected (e.g., a selected widget) (711). The scroll request can be input to the portable terminal using various input methods described with reference to FIG. 4, FIG. 5, and FIG. 6. The portable terminal may identify a scroll request when one of the input methods is detected.

The hold widget may be a widget designated by a user and may be displayed on the idle screen irrespective of the scroll through the virtual area 260. For example, a clock widget may serve as a clock and may be set as a hold function. The clock widget can be displayed on the idle screen 220 irrespective of the scroll operations.

A selection widget may be a widget selected by a touch input or an option when the portable terminal receives a request to scroll through a virtual area. For example, if the portable terminal user intends to continue displaying a particular widget on the idle screen 220 while the user scrolls through a virtual area 260, the user can request scrolling through the virtual area 260 with the selected widget. A touch input may refer to an input corresponding to a gesture such as, for example, touching a widget with the user's finger. A scroll can be requested by another touch input while another widget is being tapped by another touch. The other touch input may be a touch input of a scroll indicator or a gesture input that can be generated in an empty area on an idle screen, such as a flick/drag.

If the portable terminal ascertains that a widget is set by a hold function at 703, the portable terminal may fix a position of the hold widget on the idle screen 220 (705) and scroll through the virtual area 260 (707). The remaining widgets, other than the fixed hold widget, may be scrolled (e.g., rearranged and redisplayed) as the virtual area 260 is scrolled through. The portable terminal may then display the widgets on the scrolled virtual area 260 and the hold widget on the idle screen 220 (709).

If the portable terminal determines that a particular widget is selected (a selected widget) at 711, the portable terminal may fix a position of the selected widget on the idle screen 220 (713) and scroll through the virtual area (715). The remaining widgets, other than the fixed selected widget, may be scrolled (e.g., rearranged and redisplayed) as the virtual area 260 is scrolled through. The portable terminal may then display the widgets on the scrolled virtual area 260 and the selected widget on the idle screen 220 (717).

Although it is not shown in FIG. 7, it should be understood that, even if the hold widget and the selected widget exist simultaneously, the portable terminal may fix the positions of the hold widget and the selected widget on the idle screen 220 and scroll through the virtual area 260.

If a hold widget or a selected widget does not exist, the portable terminal may scroll through the virtual area (719) as explained with reference to FIG. 4, FIG. 5, and FIG. 6.

Figure 8:
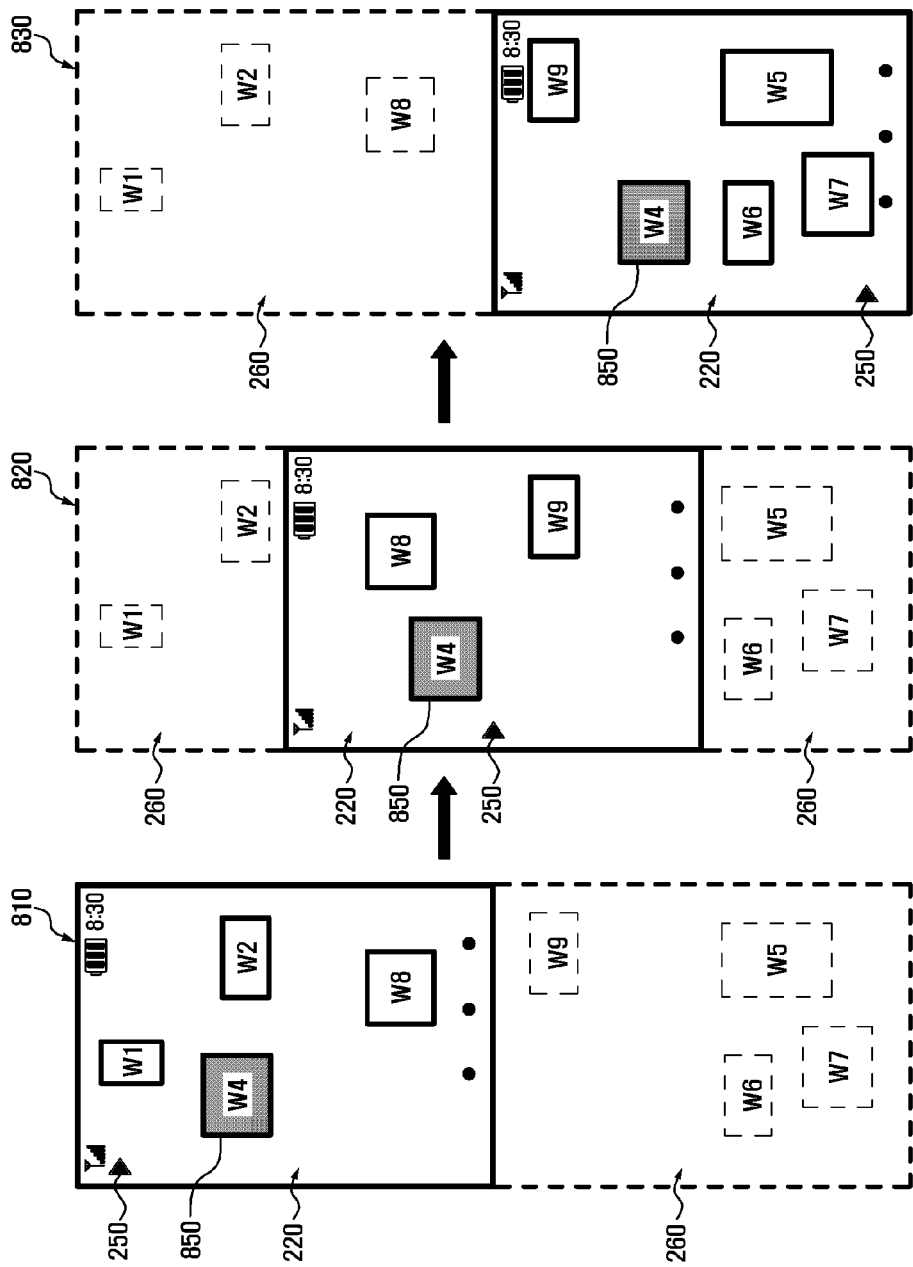
FIG. 8 illustrates screens in which a virtual area is scrolled through and a widget is set by a hold function, according to exemplary embodiments of the present invention.

FIG. 8 illustrates screens in which a virtual area is scrolled through and a widget is set by a hold function, according to exemplary embodiments of the present invention.

Referring to FIG. 8, the portable terminal may display an idle screen 220 as a default screen and may configure a virtual area 260 that extends the idle screen 220. A plurality of widgets may be arranged on the idle screen 220 and the virtual area 260. As described above, a scroll indicator 250 may be displayed on the idle screen 220.

As shown on screens 810, 820, and 830, a hold widget 850 may be fixed on the idle screen 220. The scrolling of the idle screen 220 may be controlled as explained with reference to FIG. 4, FIG. 5, and FIG. 6.

The scroll indicator 250 may be moved to and displayed on the lower side of the idle screen 220. The scroll indicator 250 may be moved and displayed based on the scrolled distance of the virtual area 260. The hold widget 850 may continue to be displayed in the same position irrespective of the scrolling of the idle screen 220 through the virtual area 260.

The hold widget 850 can be selected by the user. For example, a portable terminal user may choose a particular widget and select a hold option for the particular widget using a menu. The number of hold widgets can be set by the user.

The hold state of the widget may be retained until the hold option setting is cancelled. For example, the location of the hold widget may be fixed on the idle screen 220 irrespective of the scrolling of the idle screen 220 until the hold option setting is cancelled.

Figure 9:
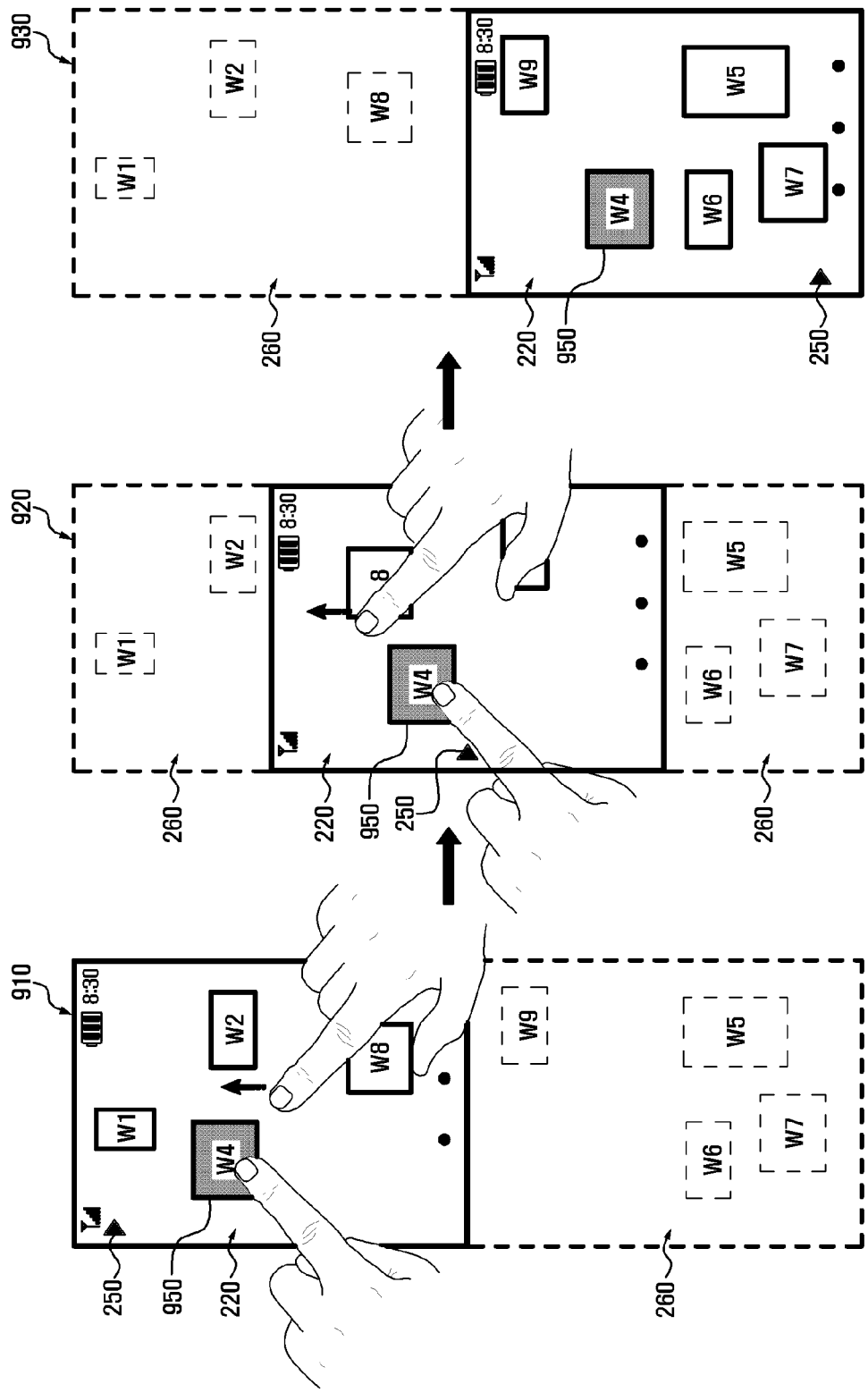
FIG. 9 illustrates screens in which a virtual area is scrolled through while a particular widget is selected, according to exemplary embodiments of the present invention.

FIG. 9 illustrates screens in which a virtual area is scrolled through while a particular widget is selected, according to exemplary embodiments of the present invention.

Referring to FIG. 9, the portable terminal may display an idle screen 220 as a default screen and may configure a virtual area 260 that extends the idle screen 260. A plurality of widgets may be arranged on the idle screen 220 and the virtual area 260. As described above, a scroll indicator 250 may be displayed on the idle screen 220.

As shown on screens 910, 920, and 930, a selected widget 950 may be fixed (i.e., a position of the selected widget is fixed) on the idle screen 220. The scrolling of the virtual area 260 may be controlled as explained above with reference to FIG. 4, FIG. 5, and FIG. 6.

The scroll indicator 250 may be moved to and displayed on the lower side of the idle screen 220. The scroll indicator 250 may be moved and displayed based on the scrolled distance of the virtual area 260. The selected widget 950 may continue to be displayed in the same position irrespective of the scrolling of the idle screen 220 though the virtual area 260.

The selected widget 950 can be selected by the user. For example, a portable terminal user may select a particular widget 850 by tapping the particular widget. While widget 850 may be selected by applying a touch input, the scrolling of the virtual area 260 can be controlled by an additional touch input, such as, for example, a flick or drag gesture. The additional touch input may be applied to the screen while a touch input continues to be applied to the selected widget 850. The additional touch input may then control scrolling through the virtual area 260.

For example, as shown on screen 920, using a multi-finger based multi-touch input, the user can select a particular widget using one finger and may designate the particular widget as the selected widget 850. The user may then input a scrolling command on the screen using another finger. Accordingly, if the particular widget retains its selected state by a touch input during the scrolling of the virtual area 260, the portable terminal may recognize the particular widget as a selected widget. The portable terminal may then fix a position of the particular widget on the idle screen 220 and control the scrolling of the idle screen 220.

The portable terminal user may choose a particular widget and may then select a select/hold option for the particular widget using a menu, thereby designating the particular widget as a selected widget. The number of selected widgets can be set by the user.

If selection of the particular widget is cancelled, the particular widget can be rearranged and moved on the screen again based on the scrolling action through the virtual area 260. The arrangement of the particular widget can be altered, for example, by the scroll control as shown in FIG. 9. Selection of a particular widget may be cancelled by, for example, stopping a touch input applied to the particular widget.

In the foregoing description, a method for scrolling a virtual area has been explained. Operations for adding or removing a particular widget to or from an idle screen are explained as follows.

Figure 10A:
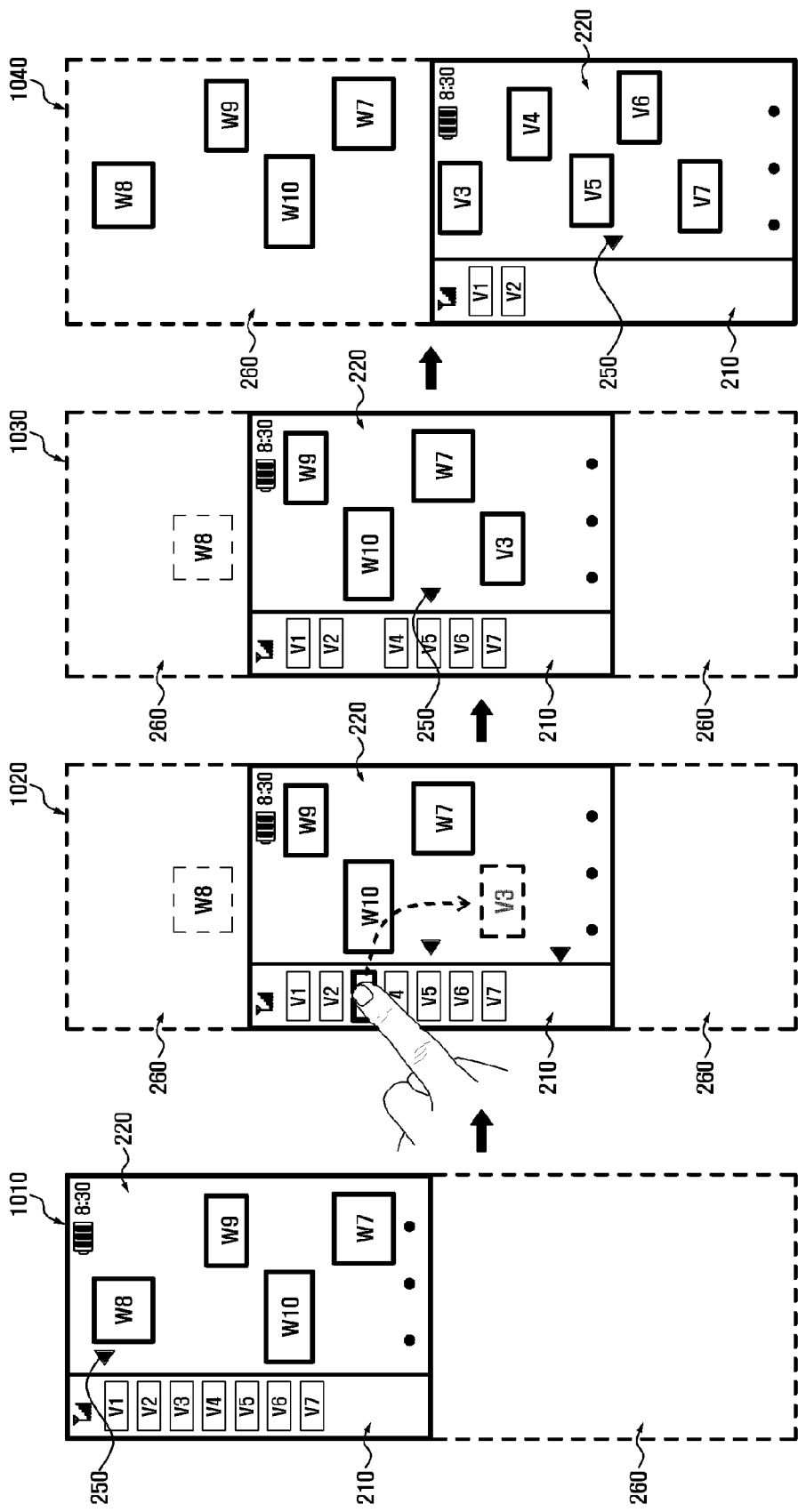

FIG. 10A illustrates screens in which a virtual area is scrolled through and a new widget is added to the idle screen, according to exemplary embodiments of the present invention. FIG. 10B illustrates screens in which a virtual area is scrolled through and a widget is removed from the idle screen, according to exemplary embodiments of the present invention.

Referring to FIG. 10A, the portable terminal may open a tray 210 and display the tray 210 on an idle screen 220 in response to a user's request as shown in screen 1010. The is user's request may be a user's input on a scroll indicator 250. For example, a portable terminal user may tap the scroll indicator 250 to open the tray 210. When the portable terminal detects a touch input for the scroll indicator 250, the portable terminal may open and display the tray 210 on the idle screen 220.

The scroll indicator 250 may change its indicating direction according to the direction of the opened tray 210. The touch input may be a tap gesture generated on the scroll indicator 250. The tap gesture may differ from a drag gesture or a touch & drag gesture that serves to scroll through the virtual area 260 using the scroll indicator 250.

It should be understood that the touch input for opening/closing the tray 210 may not be limited to the tap gesture. The touch input for opening/closing the tray 210 may be implemented using various types of inputs and may differ from the touch inputs for scrolling through the virtual area 260 using the scroll indicator 250.

Scrolling through the virtual area 260 can be controlled as explained with reference to FIG. 4, FIG. 5, and FIG. 6.

As shown on screens 1020 and 1030, a portable terminal user can move and add a particular widget to the idle screen

220. For example, the user may generate an input event (i.e., selection) on an icon (e.g., 'V3') that is situated on the tray 210 and may request an addition of a new widget to the idle screen 220. The input event may be a touch event, such as, for example, a drag & drop gesture and a flick gesture. The input event may also include key operating events for the addition of widgets.

The portable terminal may move the particular widget icon on which an input event has occurred from the tray 210 to the idle screen 220 in response to the request, and may then execute the widget associated with the particular widget icon. When the portable terminal detects that a new widget is added to the idle screen 220, the portable terminal can update the arrangement information based on the widget information and location information associated with the widget.

When the particular widget is added to the idle screen 220 and the virtual area 260 is scrolled through as shown on screen 1040, the added widget may move relative to the idle screen 220 according to the scrolling of the idle screen 220.

Referring to FIG. 10B, the idle screen 220 may scroll through the virtual area 260 as shown in screens 1050, 1060, and 1070, using the process described with reference to FIG. 4, FIG. 5, and FIG. 6.

As shown on screens 1060 and 1070, a portable terminal user can move a widget from the idle screen 220 to the tray 210, thereby removing the widget from the idle screen 220. The user may generate an input event with respect to a widget existing on the idle screen 220 and may request movement of the widget to the tray 210. The input event may be a touch event such as, for example, a drag and drop gesture or a flick gesture. The input event may also include key operating events for the movement of widgets.

A widget on which an input event has occurred may be moved from the idle screen 220 to the tray 210. The widget icon may be removed from the idle screen 220 to the tray 210. When the portable terminal detects that the widget has been removed from the idle screen 220, the portable terminal can update the arrangement information.

As shown in FIGS. 10A and 10B, the portable terminal may remove the tray 210 from the idle screen 220 in response to a user's request to close the tray 210, i.e., the input event generated at the scroll indicator 250. Although an embodiment of the present invention is implemented in such a way that a particular widget is added or removed, it should be understood that the present invention is not limited to the embodiment. For example, the embodiment may be modified in such a way that the location of a particular widget can be changed. As such, if the configuration of the widgets is changed on the idle screen 220, the portable terminal stores the changed information and can update the arrangement information based on the changed information in real time.

As shown in FIGS. 10A and 10B, the embodiment of the present invention is implemented in such a way that it is operated by an input event that has occurred on the touch screen. It should be understood that the present invention is not limited to the embodiment. That is the embodiment may be modified in such a way that it can be operated by a mouse pointer or a keypad of a portable terminal. For example, if a user uses a selection key/direction keys/numerical keys on the keypad, the widgets and the widget icons may undergo selection, execution, addition, removal, etc., and the virtual area 260 may also undergo its scroll control.

The portable terminal can be applied to all information communication devices, multimedia devices, and their applications, such as, for example, a personal digital assistant (PDA), a portable multimedia player (PMP), an MP3 player, a digital broadcast player, or a mobile communication terminal. In the following description, a configuration of the portable terminal is explained in detail with reference to FIG. 11.

Figure 11:
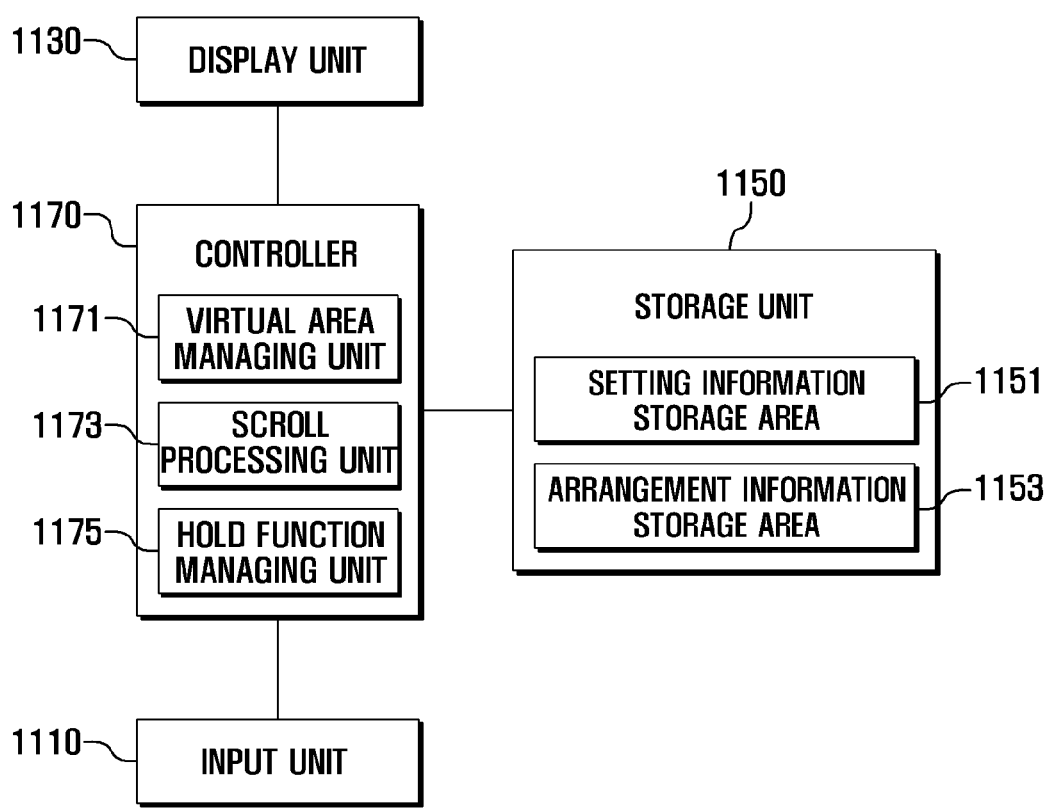
FIG. 11 is a schematic block diagram illustrating a portable terminal according to exemplary embodiments of the present invention.

FIG. 11 is a schematic block diagram illustrating a portable terminal according to exemplary embodiments of the present invention.

Referring to FIG. 11, a portable terminal may include an input unit 1110, a display unit 1130, a storage unit 1150, and a controller 1170. The storage unit 1150 may include a setting information storage area 1151 and an arrangement information storage area 1153. The controller 1170 may include a virtual area managing unit 1171, a scroll processing unit 1173, and a hold function managing unit 1175.

The input unit 1110 may receive a variety of text information and may output signals related to the settings of the portable terminal associated with a variety of functions. The input unit 1110 may also transmit signals to the controller 1170. The input unit 1110 may be implemented using any suitable input means such as, for example, a touch pad. The touch pad may be integrated or separated from the portable terminal. Other examples of suitable input units 1110 include a touch pad, a touch screen, a keypad of a general key arrangement, a QWERTY keypad, and an input device having function keys for performing particular operations, or a combination thereof. The input unit 1110 may receive signals for selecting, moving, and removing a widget, and signals for controlling scroll operations, and may then output the signals to the controller 1170.

The display unit 1130 may display screen data generated when the portable terminal is operated. The display unit 1130 may also display the input event, state information regarding operations and key operations, and function setting information. The display unit 1130 can display an idle screen 220 containing at least one widget, a tray 210, a scroll indicator 250, and screen data of a virtual area 260. The screen data may be related to scrolling operations. Furthermore, the display unit 1130 can display signals and information regarding colors provided by the controller 1170.

The display unit 1130 can display data related to screen operations according to the control of the controller 1170. For example, the display unit 1130 may display a virtual area 260 extending an idle screen 220 according to a scrolling operation. The display unit 1130 can display a scroll indicator 250 on the idle screen 220. The scroll indicator 250 may open/close a tray and may control the scrolling operations. The scroll indicator 250 may be displayed relative to the position of the idle screen 220 and virtual area 260. The display unit 1130 may move and display the scroll indicator 250 in proportion to the scrolled distance of the virtual area 260.

The display unit 1130 may be implemented with a liquid crystal display (LCD), and may include an LCD controlling unit, a memory for storing image data, and an LCD device.

The display unit 1130 may also be implemented with a touch screen. A touch screen may be a display equipped with an input apparatus that can detect a touch event. A user's finger or an object such as a pen may be used to provide an input on the touch screen. Examples of the touch event include, but are not limited to, a touch, drag, tap, and/or flick. When an input event occurs at a particular position corresponding to a widget or a user interface on the touch screen, the portable terminal may detect the position and execute an application program related to the widget. The application program may be stored in the storage unit 1150. The touch screen may be a display through which the portable terminal can directly receive information.

The touch screen may include a touch panel installed to the display unit 1130 of the portable terminal. The touch panel may detect a touch of a user's finger or an object, and may process the touch as a touch event or input event. When an input event occurs on an item (e.g., a widget, a widget icon, a scroll indicator, an image, a user interface, etc.) on a touch screen, the controller 1170 detects the input event and processes a command corresponding to the item. Using the touch screen, the user can easily acquire information from the portable terminal.

For example, when an input event occurs at a preset area on a touch screen due to an action of the user's finger or a pen, the controller 1170 may detect the position information of the input event. The controller 1170 may then apply an effect to an item at the position and may then display the item on the display unit 1130. The display unit 1130 can also display the scrolled virtual area 260 according to the input event on the idle screen 220.

The display unit 1130 may receive control signals through the touch screen and may output the control signals to the controller 1170. The configuration and operations of the display unit 1130 have been explained hereinabove.

The storage unit 1150 may be implemented with read only memories (ROMs) and random access memories (RAMs). The storage unit 1150 may store a variety of data generated and used in the portable terminal. The data may include data generated as application programs are executed in the portable terminal. The data may also include all types of data that can be stored in the portable terminal, for example, data generated or received in or by the portable terminal. The data may, for example, include data related to widgets, widget icons, virtual areas, and the scroll operations. Furthermore, the data may also include a variety of setting information associated with the user interfaces and use of the portable terminal.

The storage unit 1150 can store setting information related to the function of the virtual area 260. The setting information may be information regarding activation/deactivation of the virtual area 260, information regarding a hold function, and information to set a size of the virtual area 260. The setting information can be stored in the setting information storage area 1151. The storage unit 1150 can store arrangement information regarding widgets on the virtual area. The arrangement information may include widget information and location information regarding widgets on the virtual area 260, and may be stored in the arrangement information storage area 1153.

The storage unit 1150 may store application programs for controlling the operations of the portable terminal and the scroll operations. The application programs may process scroll operations as described hereinabove, and the application programs may be stored in an application storage area (not shown) of the storage unit 1150.

The storage unit 1150 may include at least one or more buffers that can temporarily store data generated as the application programs are executed. The storage unit 1150 may be installed within the portable terminal or may be attached to the portable terminal. For example, the storage unit 1150 may include a smart card attached to the portable terminal. In general, the storage unit 1150 may include all types of internal/external storage media.

The controller 1170 may control the operations of the portable terminal. The controller 1170 may control the signal flow between different components (e.g., input unit, display unit, storage unit) of the portable terminal.

The controller 1170 may include a data processor that is composed of a codec and at least one modem to provide a mobile communication service if the portable terminal is a mobile communication terminal. When the portable terminal supports a mobile communication service, the portable terminal may further include an RF communication module for processing RF signals.

The controller 1170 can distinguish between an idle screen layer and a virtual area layer, and may provide a virtual area 260 extending the idle screen 220 through the virtual area layer. The controller 1170 may instruct the display unit 1130 to arrange and display at least one widget on the virtual area.

The controller 1170 may control the scrolling operations according to the settings of the portable terminal. The controller 1170 can control the idle screen 220 and may scroll through the virtual area 260 not shown on the idle screen 220, so that the scrolled virtual area 260 can appear on the idle screen 220. The controller 1170 may control the scrolling operations according to the user's input. For example, the controller 1170 can scroll through the virtual area 260 according to at least one of the methods explained hereinabove.

For example, the controller 1170 may control the scrolling operations when a widget is fixed and displayed according to the hold and selection functions described above. Additionally, the controller 1170 can add a widget in a user-specified location on the idle screen 220 that may be altered as the virtual area is scrolled through. The controller 1170 can also remove a widget from the idle screen 220 as describe above. In general, the controller 1170 can adaptively change and update the arrangement of the plurality of widgets using the scrolling operations. The controller 1170 can update arrangement information in real time.

As described above, the controller 1170 may include the virtual area managing unit 1171, the scroll processing unit 1173, and the hold function managing unit 1175.

The virtual area managing unit 1171 may process operations related to extensions of the idle screen 220 using a virtual area 260. For example, the virtual area managing unit 1171 may activate/deactivate the virtual area 260 and may configure the idle screen 220 according to the activation/deactivation of the virtual area 260. The virtual area managing unit 1171 may also call and arrange at least one widget on the virtual area 260 using arrangement information when the virtual area 260 is activated. In addition, the virtual area managing unit 1171 may call and arrange at least one widget on the idle screen 220 using arrangement information when the virtual area 260 is deactivated.

The scroll processing unit 1173 may process the scrolling operations. For example, the scroll processing unit 1173 may control scrolling through the virtual area 260 by the use of the scroll indicator 250, a touch input, or movement of a particular widget as described above. The scroll processing unit 1173 may control scrolling operations such as, for example, when a hold widget and/or a selected widget are fixed and displayed at corresponding positions on the idle screen 220 as described above.

The hold function managing unit 1175 may process operations related to a hold function where one of the widgets arranged on the virtual area 260 is fixed at a position of the idle screen 220 and is continuously displayed on the idle screen 220 irrespective of the scrolling operations. The hold function managing unit 1175 may manage a hold function to set a widget (e.g., fix a location of the widget on the idle screen 220). When the scroll processing unit 1173 controls the scrolling operations, the hold function managing unit 1175 may fix and display a widget on the idle screen 220 according to the hold function. The hold function managing unit 1175 may manage a hold function to set a widget (e.g., fix a location of the widget selected by user on the idle screen 220). When the scroll processing unit 1173 controls the scrolling operations in a state where a particular widget, displayed on the idle screen, is selected by user, the hold function managing unit 1175 may fix and display the selected widget on the idle screen 220, according to the hold function. When the hold function managing unit 1175 ascertains that the scroll processing unit 1173 controls the scrolling of the virtual area 260, the hold function managing unit 1175 may determine whether a hold widget or a selected widget exists and may then output, to the scroll processing unit 1173, a control value according to the determination.

According to exemplary embodiments of the present invention, the portable terminal may further include a digital broadcast receiving module, a short-range communication module, an Internet communication module, and a camera module. If the portable terminal is implemented to support a mobile communication service, the portable terminal can further include a communication module and an RF module. The communication module may be composed of a codec and a modem. In addition, it should be understood that various combinations and modifications of the above-noted modules may be used, and that exemplary embodiments are not limited to the modules noted above.

For example, if the portable terminal supports short-range communication, such as Bluetooth communication or Zigbee communication, the portable terminal can include a short-range communication module. The short-range communication module can be used to communicate with other portable terminals via short-range communication. If the portable terminal supports Internet communication via an Internet network, the portable terminal can include an Internet module. The Internet module can be used for wirelessly communicating with other portable terminals and network systems via the Internet network. Furthermore, if the portable terminal is implemented to provide a function related to digital broadcasting, the portable terminal can include a broadcast receiving module.

As described above, the method and system for configuring an idle screen, according to the present invention, can overcome the spatial limitation of the idle screen to arrange contents, such as widgets and shortcut icons, thereby increasing the utility of the contents.

As described above, the method and system for configuring an idle screen, according to the present invention, can extend the idle screen to a variety of virtual areas to arrange contents on the idle screen 220 and the virtual areas 260, and provide a variety of search methods to search for the contents in the virtual areas 260, thereby enhancing the search convenience with respect to the virtual areas 260.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method to display an idle screen in a portable terminal, the method comprising:
   providing an idle screen layer comprising the idle screen;
   providing a virtual area layer comprising a virtual area to extend the idle screen and at least one content arranged on the virtual area;
   displaying the idle screen layer;
   displaying, overlaying the idle screen layer, a portion of the virtual area layer corresponding to the idle screen with the at least one content arranged on the portion; and
   detecting a scroll request,
   wherein the virtual area layer is configured to be scrolled over the idle screen layer in response to the scroll request being detected to enable a scrolled portion of the virtual area layer and the at least one content arranged thereon to be displayed, and
   wherein detecting the scroll request comprises determining whether a hold content is set by a hold function, the hold content comprising one of the at least one content, and
   wherein the virtual area layer is scrolled by holding the hold content at the same location on the idle screen layer and moving other contents of the at least one content in the virtual area layer according to the scroll request, based on the determination that the hold content is set by the hold function.

2. The method of claim 1, further comprising:
   checking a state of a setting of the virtual area when the idle screen is displayed; and
   providing the idle screen extended by the virtual area, the idle screen comprising the virtual area comprising at least some other content.

3. The method of claim 2, further comprising:
   scrolling the virtual area layer in a scroll direction according to the scroll request; and
   displaying, overlaying the idle screen layer, the at least some other content arranged on the scrolled portion of the virtual area layer.

4. The method of claim 3, wherein detecting the scroll request comprises:
   controlling a scroll indicator displayed on the idle screen by controlling at least one content displayed on the idle screen, or by touching the idle screen.

5. The method of claim 3, further comprising:
   determining, in response to the scroll request, whether selected content selected according to the scroll request exists.

6. The method of claim 5, further comprising:
   fixing and displaying the hold content at a fixed position on the idle screen while the virtual area layer is scrolled.

7. The method of claim 5, further comprising:
   fixing and displaying, if the selected content exists and if selection of the selected content is retained, the selected content at a position on the idle screen while the virtual area is scrolled.

8. The method of claim 5, further comprising:
   fixing positions of the hold content and the selected content on the idle screen; and
   displaying, overlaying the idle screen layer, at least one content arranged on the scrolled portion of the virtual area layer and the hold content and the selected content.

9. A portable terminal, comprising:
   a display unit configured to provide:
     an idle screen layer comprising an idle screen, and
     a virtual area layer comprising a virtual area to extend the idle screen and at least one content arranged on the virtual area layer;
   a storage unit configured to store setting information associated with a function of the virtual area layer and arrangement information associated with the at least one content; and
   a controller configured to:
     control the display unit to display the idle screen layer,
     control the display unit to display, overlaying the idle screen layer, the portion of the virtual area layer corresponding to the idle screen with the at least one content arranged on the portion,
     detect a scroll request, control, in response to detection of the scroll request, scroll operations to enable a scrolled portion of the virtual area to scroll over the idle screen layer and be displayed, and determine whether a hold content is set by a hold function, the hold content comprising one of the at least one content, wherein the controller is further configured to control the display unit to scroll through a portion of the virtual area layer by holding the hold content at the same location on the idle screen layer and moving other contents of the at least one content in the virtual area layer according to the scroll request, based on the determination that the hold content is set by the hold function.

10. The portable terminal of claim 9, wherein the setting information comprises:

information regarding activation and/or deactivation of the virtual area, information regarding a hold function, and virtual area size information to set a size of the virtual area.

11. The portable terminal of claim 10, wherein the controller is further configured to control the display unit to scroll through the scrolled portion of the virtual area in response to the scroll request.

12. The portable terminal of claim 11, wherein the controller is further configured to control the scroll operations in association with a scroll indicator provided on the idle screen, the scroll operations being controlled in association with a content provided via the idle screen or in response to a touch event on the idle screen.

13. The portable terminal of claim 11, wherein, in response to the scroll operations, the controller is further configured to determine whether a selected content, selected according to the scroll request, exists.

14. The portable terminal of claim 13, wherein the controller is further configured to control the display unit to fix and display the hold content at a fixed position on the idle screen while the scrolled portion of the virtual area is scrolled through.

15. The portable terminal of claim 13, wherein, if the selected content exists, the controller is further configured to control the display unit to fix and display, while the selection of the selected content is retained, the selected content at a position on the idle screen while the scrolled portion of the virtual area is scrolled.

16. The portable terminal of claim 13, wherein the controller is further configured to fix positions of the hold content and the selected content on the idle screen and to control the display unit to display the at least one content arranged on the scrolled portion of the virtual area and the hold content and the selected content on the idle screen.

17. The portable terminal of claim 13, wherein the controller comprises:

a virtual area managing unit configured to control extension of the idle screen via the virtual area layer;

a scroll processing unit configured to control the scroll operations; and a hold function managing unit configured to:

fix the hold content at a position on the idle screen, and control display of the hold content irrespective of the scroll operations.

18. The portable terminal of claim 17, wherein the virtual area managing unit is further configured to activate and/or deactivate the virtual area, call the at least one content arranged on the virtual area layer based on at least some of the arrangement information when the virtual area is activated, and control display of the at least one content arranged on the virtual area layer on the idle screen.

19. The portable terminal of claim 17, wherein the scroll processing unit is further configured to control the scroll operations executed in association with a scroll indicator, a touch event, and a movement of a content, and further configured to fix, in association with the hold function managing unit, corresponding positions of hold content and selected content on the idle screen when at least the portion of the virtual area is scrolled through.

20. The portable terminal of claim 17, wherein the scroll processing unit is further configured to detect the scroll operations, and wherein the hold function managing unit is further configured to determine whether the selected content exists in response to detection of the scroll operations by the scroll processing unit, and further configured to output a control value based on the determination to the scroll processing unit.

21. The portable terminal of claim 20, wherein the hold function managing unit is further configured to manage the hold function to hold the hold content, and further configured to fix and control the display unit to display the hold content and the selected content on the idle screen when the scroll operations are controlled.

22. The portable terminal of claim 11, wherein the controller is further configured to add or remove a content on the idle screen in response to reception of a user request.

23. The portable terminal of claim 22, wherein the controller is further configured to adaptively change and store an arrangement of content on the idle screen according to the scroll operations.

24. A display unit of a portable terminal, comprising:

at least one display screen configured to:

provide an idle screen layer comprising an idle screen presentation;

provide a virtual area layer to extend the idle screen presentation, the virtual area layer comprising a navigable virtual area presentation and at least one content arranged on the virtual area layer;

display the idle screen layer; and display, overlaying the idle screen layer, a portion of the virtual area layer corresponding to the idle screen with at least one content arranged on the portion, wherein the virtual area layer is configured to be scrolled over the idle screen layer in response to detection of a scroll request to enable a scrolled portion of the navigable virtual area presentation and the at least one content arranged thereon to be displayed, and wherein the at least one display screen is further configured to scroll through a portion of the virtual area layer by holding a hold content at the same location on the idle screen layer and moving other contents of the at least one content in the virtual area layer according to the scroll request, based on a determination that the hold content is set by a hold function, the hold content comprising one of the at least one content.

25. The method of claim 1, further comprising:

detecting movement of one of the displayed content as the scroll request;

scrolling, in response to the scroll request, to a scrolled portion of the virtual area layer; and displaying, on the idle screen, at least the one of the displayed content over at least some of the scrolled portion of the virtual area layer.

26. The method of claim 25, wherein detecting movement of one of the displayed content as a scroll request comprises detecting movement of the one of the displayed content to an edge of the idle screen layer, the method further comprising:
- determining, in response to detecting the movement of the one of the displayed content to the edge of the idle screen layer, whether the one of the displayed content is the hold content; and
- effectuating, if the one of the displayed content is the hold content, the scrolling to the scrolled portion of the virtual area.

27. The method of claim 26, further comprising:
- detecting, in association with the one of the displayed content, release of the hold function of the hold content at a position associated with the scrolled portion of the virtual area; and
- arranging the one of the displayed content at the position.

28. The portable terminal of claim 9, wherein the controller is further configured to:
- detect movement of a one of the displayed content as a scroll request;
- control, in response to the scroll request, scroll operations to a scrolled portion of the virtual area; and
- control display, on the idle screen, of at least the one of the displayed content over at least some of the scrolled portion of the virtual area.

29. The portable terminal of claim 28, wherein the controller is further configured to:
- detect the movement of the one of the displayed content to an edge of the idle screen layer;
- determine, in response to detection of the movement of the one of the displayed content to the edge of the idle screen layer, whether the one of the displayed content is the hold content; and
- effectuate, if the one of the displayed content is the hold content, the scroll operations to the scrolled portion of the virtual area.

30. The portable terminal of claim 29, wherein the controller is further configured to:
- detect, in association with the one of the displayed content, release of the hold function of the hold content at a position associated with the scrolled portion of the virtual area; and
- arrange the one of the displayed content at the position.

31. The display unit of claim 24, wherein the at least one display screen is further configured to:
- display movement of one of the displayed content as a scroll request;
- display, in response to the scroll request, scrolling to a scrolled portion of the navigable virtual area presentation; and
- display, over the idle screen, at least the one of the displayed content over at least some of the scrolled portion of the navigable virtual area presentation.

32. The display unit of claim 31, wherein display of the scrolling to the scrolled portion of the navigable virtual area presentation is effectuated if the one of the displayed content is the hold content and is moved to an edge of the idle screen layer.

33. The display unit of claim 32, wherein, if the hold function of the hold content is released at a position associated with the scrolled portion of the navigable virtual area presentation, the at least one display screen is further configured to display arrangement of the one of the displayed content at the position.

* * * * *